United States Patent
Gollehon et al.

(10) Patent No.: US 10,502,561 B2
(45) Date of Patent: Dec. 10, 2019

(54) TECHNIQUES FOR DETERMINING AN ANGULAR OFFSET BETWEEN TWO OBJECTS

(71) Applicant: Accu-Scribe LLC, Butte, MT (US)

(72) Inventors: Brian Ross Gollehon, Anaconda, MT (US); Tyler D. Hochstetler, Atmore, AL (US); Skyler B. Reeves, Butte, MT (US); Chase Maier, Seattle, WA (US)

(73) Assignee: Accu-Scribe LLC, Butte, MT (US)

( * ) Notice: Subject to any disclaimer, the term of this patent is extended or adjusted under 35 U.S.C. 154(b) by 5 days.

(21) Appl. No.: 15/912,540

(22) Filed: Mar. 5, 2018

(65) Prior Publication Data

US 2018/0195859 A1   Jul. 12, 2018

Related U.S. Application Data

(63) Continuation-in-part of application No. 15/604,192, filed on May 24, 2017.

(60) Provisional application No. 62/487,473, filed on Apr. 19, 2017, provisional application No. 61/341,998, filed on Apr. 8, 2010.

(51) Int. Cl.
    *G01B 11/26* (2006.01)
    *G01B 11/27* (2006.01)

(52) U.S. Cl.
    CPC .................. *G01B 11/272* (2013.01)

(58) Field of Classification Search
    CPC ....... G01B 11/26; G01B 11/272; G01B 11/27; G01C 15/004; G01C 15/002
    USPC ....................................... 356/138
    See application file for complete search history.

(56) References Cited

U.S. PATENT DOCUMENTS

| | | | |
|---|---|---|---|
| 6,708,782 B1 | 3/2004 | Turney | |
| 2003/0070844 A1 | 4/2003 | Radzinsky et al. | |
| 2008/0164025 A1 | 7/2008 | Peter | |
| 2008/0230273 A1 | 9/2008 | Brooks | |
| 2009/0289120 A1* | 11/2009 | Hanson | G01C 15/02 235/462.1 |

(Continued)

FOREIGN PATENT DOCUMENTS

| | | |
|---|---|---|
| CN | 104234698 B | 2/2017 |
| EP | 0471659 | 2/1992 |

(Continued)

OTHER PUBLICATIONS

Office Action for U.S. Appl. No. 15/604,192, dated Aug. 31, 2018, Brian Ross Gollehon, "Techniques for Determining an Angular Offset Between Two Objects", 9 pages.

(Continued)

*Primary Examiner* — Md M Rahman
(74) *Attorney, Agent, or Firm* — Victor H. Segura

(57) ABSTRACT

An angular offset apparatus for determining an angular offset, or scribe line offset (SLO), of two objects within a drilling environment. The angular offset apparatus may include a sensing component and a target component located at various locations within the drilling environment. The sensing component may implement one or more sensors configured to collect data associated with the target component and the drilling environment to determine the SLO between the two objects. The angular offset apparatus, along with the calculated SLO, is designed to ensure accuracy and safety during drilling operations.

20 Claims, 15 Drawing Sheets

(56) References Cited

U.S. PATENT DOCUMENTS

2014/0008125 A1   1/2014  Hay
2017/0199302 A1   7/2017  Logan et al.
2017/0342819 A1  11/2017  Gollehon et al.

FOREIGN PATENT DOCUMENTS

EP          0471659 A1    2/1992
GB          2231357 A    11/1990
WO     WO2017205620 A1   11/2017

OTHER PUBLICATIONS

The PCT Search Report and Written Opinion dated Aug. 17, 2017 for PCT application No. PCT/U2017/034464, 12 pages.
PCT Search Report and Written Opinion dated May 28, 2019 for PCT Application No. PCT/US2019/019767, 12 pages.

* cited by examiner

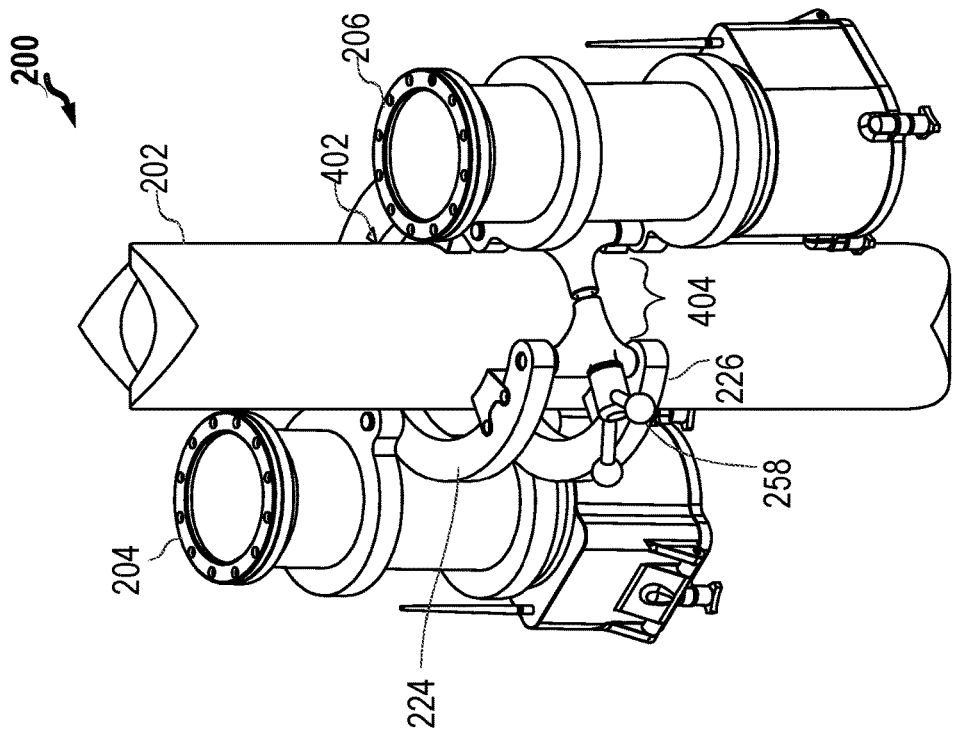
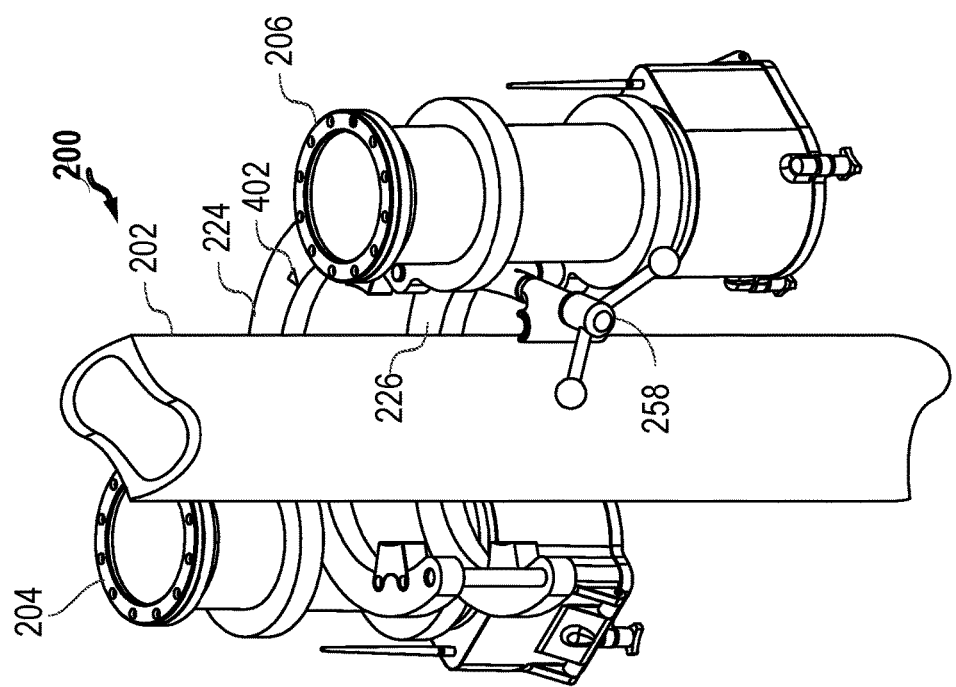

TECHNIQUES FOR DETERMINING AN ANGULAR OFFSET BETWEEN TWO OBJECTS

This application is a continuation-in-part of and claims priority to U.S. application Ser. No. 15/604,192, filed on May 24, 2017, entitled "System and Method for Determining an Angular Offset Between Two Objects," which is a non-provisional of and claims priority to Provisional Application No. 61/341,998 filed on May 26, 2016 entitled "System and Method for Determining an Angular Offset Between Two Objects," and Provisional Application No. 62/487,473, filed on Apr. 19, 2017, entitled "Techniques for Determining an Angular Offset Between Two Objects," the contents of which are incorporated herein by reference. In addition, the contents of U.S. application Ser. No. 62/284, 406, filed on Sep. 29, 2015, entitled "ACCU-Scribe, being an improvement in drilling technology," are also incorporated herein by reference.

BACKGROUND

A variety of techniques are utilized in the oil and gas field when creating a new borehole or well. Drilling techniques may vary depending on the type of formation, the location of the rig, the product to be extracted, etc. During formation of the borehole, a well-bore plan, or other previously designed plan for drilling the borehole, is implemented via a computing system or human operations, in conjunction with the borehole assembly, to ensure accurate drilling measurements. Accurate drilling measurements ensure that the reservoir of product, such as oil and/or gas, is reached during the drilling process.

The borehole assembly may include a directional tool, such as a Measurement While Drilling (MWD) tool, often having internal computers that use accelerometers and magnetometers to determine the direction of the tool heading, otherwise referred to as the high-side of the tool. A downhole tool, such as a drilling motor, mud motor, or any other suitable downhole tool, may also be utilized. The downhole tool may include a bent housing located at a bottom end of the tool, such as the bottom end of the drilling motor.

While the downhole tool does not have computer technology within itself, it may be attached to the directional tool during drilling operations. The directional tool may operate according to the well-bore plan, thereby controlling the direction of the downhole tool according to the well-bore plan. When the directional tool and downhole tool are attached, the heading of the directional tool and the heading of the downhole tool may be different. The heading of the various drilling tools may be indicated by a high-side marking, or other indicator, that is marked on the exterior of the drilling tool.

The offset between the directional tool heading and the downhole tool heading, referred to as the angular offset or scribe line offset (SLO), needs to be accounted for and provided to the computing device, or employee, controlling the well-bore plan to ensure accurate drilling. If the SLO is not accounted for, the drilling measurements may have inaccuracies that can lead to drilling issues and mistakes, such as missing the product reservoir, leading to costly time delays and even abandonment of the borehole.

Conventional techniques for calculating the SLO are often left to human approximations. For example, conventional techniques include a rig employee using line of sight to roughly estimate the SLO. An employee may stand at the base of the downhole tool, beneath a directional tool suspended above, and estimate the SLO between a high-side marking indicating the heading of the directional tool and a high-side marking indicating the heading of the downhole tool. This method of calculating the SLO leaves room for significant human error as little accuracy can be ensured using human estimations alone. For example, a drilling employee may be standing at a distance of seventy feet, or longer, below the high-side marking of the directional tool, making it very difficult to visually estimate the offset between the heading of the directional tool and the heading of the downhole tool. Mistakes in the directional-drilling measurements can lead to problems drilling the wellbore, and even abandonment, resulting in costly and time-consuming setbacks.

In addition, safety issues can also be of concern. The drilling environment can be filled with many hazardous conditions related to drilling machinery and operations. For example, requiring that an employee stand below a suspended MWD during drilling operations can lead to increased risk of human injury.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4A illustrates a second perspective view of the sensing component of FIG. 2 in an unlatched configuration.

FIG. 4B illustrates a third perspective view of the sensing component of FIG. 2 in a latched configuration.

DETAILED DESCRIPTION

Figure 1:
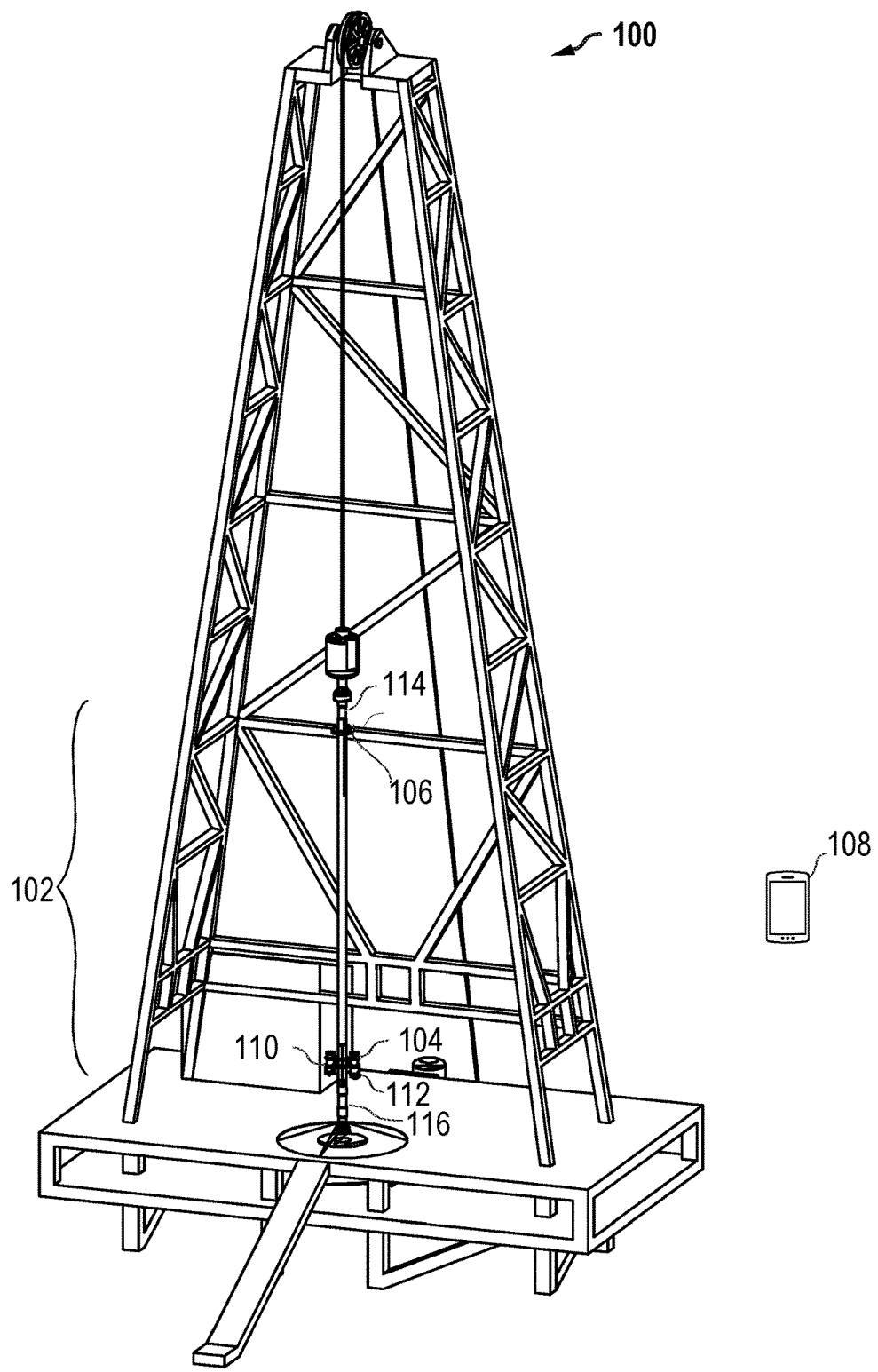
FIG. 1 illustrates an example drilling rig implementing an angular offset apparatus according to some examples.

The present disclosure is directed to techniques for determining an angular offset, or scribe line offset (SLO), for use in drilling a wellbore during oil and gas operations. In some examples, a sensing component and a target component may be implemented for use in calculating the SLO for a particular oil and gas rig. For example, the sensing component may be placed adjacent to a first drilling tool of the rig and the target component may be placed adjacent to a second drilling tool. The sensing component and the target component may be placed opposite each other within the rig environment. For example, the sensing component may be placed adjacent to the rig floor, adjacent to a downhole tool, and the target component may be suspended above the rig floor, adjacent to a directional tool. Each tool may also include a high-side marking which indicates the high-side, or heading, of the tool.

The sensing component may be implemented to collect various data associated with the heading, indicated by the high-side marking, of the directional tool or downhole tool. For example, the sensing component may be located adjacent to the high-side marking of the downhole tool and collect image data of the target component, located adjacent to the high-side marking of the directional tool. The sensing component may collect data related to the target component to calculate the SLO between the high-side marking of the downhole tool and the high-side marking of the directional tool. The calculated SLO may then be provided to the rig computer(s), such as the directional tool computer(s), to ensure accurate and timely drilling measurements are used to plan the trajectory of drilling the wellbore. In some implementations, the sensing component and target component may be placed on the drilling tools and in the rig environment throughout the course of drilling operations (e.g., during the laying down or picking up of the borehole assembly), resulting in the ability to have at or near real-time SLO calculations, further reducing the risk of drilling complications due to SLO errors and the need for drilling employees to be on site for SLO-related operations.

The sensing component may implement one or more sensors designed to collect data related to imaging, local positioning, heat, light (e.g., including electromagnetic radiation of any frequency), etc. The sensing component may be securely attached adjacent to the high-side marking of a drilling tool, which indicates the heading of the tool, and may be located opposite the target component. Exact placement of the sensing component may vary depending on the weight restrictions and drilling requirements of the rig. For example, the sensing component may be securely attached adjacent to the high-side marking of a downhole tool in some examples or may be securely attached adjacent to the high-side marking of a drilling tool in other examples. In additional examples, the sensing component may be placed adjacent to a top-drive located above both the drilling tool and the directional tool. The sensing component may also implement a microcontroller, a wireless communication device, and an energy source, among other components, to provide the sensing data to an external device for processing. Alternatively, the sensing component may process the sensing data locally.

The target component may implement various marking and/or indicator components, as well as local positioning sensors. For example, the target component may implement an LED array that includes one or more markings indicating pre-determined increments, as well as an indicator that is aligned with a drilling tool high-side marking. In other examples, the target component may implement an LED component that is linear in design, such as a bar configuration, and may include one or more LED lights extending along the LED component in a linear fashion and functioning as part of an illumination system. As described above with respect to the sensing component, exact placement of the target component may vary with each rig and multiple example placements will be described herein.

In some examples, the sensing component may be located at a downhole tool near the rig floor and the target component may be located at a directional tool that is suspended above the rig floor. Both the sensing component and the target component may be located at external high-side markings of the downhole tool and the directional tool, respectively. The sensing component may implement one or more imaging sensors, such as cameras configured to capture stationary or rotational image data or video data, configured to gather image data of the target component. The image data may then be transmitted to an external computing system to determine the SLO.

In other examples, the sensing component may implement one or more sensors configured to detect light, including electromagnetic radiation of any frequency, emitted from a target component. For instance, the target component may implement one or more light emitting components, such as a laser, where at least one of the light emitting components may be aligned, either manually or through an automated process, with the external high-side marking of a directional tool. The light detecting sensor(s) of the sensing component may be configured to detect light from the light emitting component(s) of the target component to determine the SLO.

In still further examples, the sensing component and the target component may be implemented as part of a local positioning system for determining the SLO of a rig environment. In this example, the sensing component and the target component may each implement one or more antennas or beacons that are placed adjacent to the high-side marking of the directional tool and the high-side marking of the downhole tool. The local positioning system may use beacon data to calculate the locations/positions of the high-sides of the directional tool and the downhole tool using any number of methods such as triangulation, trilateration, multilaterion, etc. The location/position data of the high-sides can then be transmitted to a computing device and used to calculate the SLO.

The techniques, systems, and devices described herein improve the safety and accuracy of oil and gas drilling operations, such as during the picking up and laying down of the borehole assembly. For example, the systems and methods for determining the angular offset between two objects described herein helps ensure that an accurate SLO can be calculated for directional drilling operations. In addition, in some examples, real-time calculations may be achieved. In contrast to the traditional methods of calculating an SLO using visual estimations alone, the systems and methods described below utilize sensing and target components, along with computer technologies, to calculate a precise SLO that minimizes the margin of error associated with visual estimations.

In addition to the oil and gas related implementations described above, the techniques, systems, and examples described herein may be implemented in technology areas related to type-fitting, welding, construction, architecture, surveying and dimensional analysis, mining, natural resource wells, pipeline fittings, safety designs, etc.

These and other examples are described below in more detail with reference to the representative architecture illustrated in the accompanying figures.

FIG. 1 illustrates an example drilling rig environment 100 implementing an angular offset apparatus 102 according to some examples. In this example, the angular offset apparatus 102 includes a sensing component 104, a target component 106, and a computing device 108.

In some examples, the sensing component 104 is placed adjacent to the high-side marking of a downhole tool 116. The sensing component 104 may implement one or more sensors configured to collect data related to imaging, local positioning, heat, light (e.g., including electromagnetic radiation of any frequency), etc. For instance, in the illustrated example, the sensing component 104 implements two sensors 110, 112 that are mounted on the exterior of the downhole tool 116. However, in other examples, any number of sensors may be implemented in various configurations.

In some examples, at least one of the sensors 110, 112 may be aligned with a high-side marking of the downhole tool 116 to serve as an origin point for determining the scribe line offset (SLO). In other examples, the sensors 110, 112 may not be aligned with the high-side marking of the downhole tool 116 and may be placed adjacent to other locations within the rig environment 100. In these instances, the sensing component 104 may include an indicator mark that indicates the location of the high-side marking of the downhole tool 116. The sensing component may also include markings that allow for the offset between the sensors 110, 112 and the indicator mark aligned with the high-side marking of the downhole tool 116 to be calculated and used when determining the SLO.

In further examples, the target component 106 may be placed adjacent to the high-side marking of a directional tool 114. The target component may 106 include one or more indicators placed adjacent to the high-side marking of the directional tool 114 that are visible and able to be detected by the sensors 110, 112 of the sensing component 104. For example, the target component 106 may include a collar with lined markings, such as LED markings, each spaced a pre-determined distance apart. At least one of the lined markings may be unique to indicate the high-side marking of the directional tool 114. For instance, the unique lined marking may include a perpendicular hash mark, or some other marking to distinguish the unique lined marking from the rest of the lined markings.

In some examples, the sensors 110, 112 may include imaging sensors configured to collect image data of the target component 106. In particular, sensors 110, 112 may take stationary photos from each side of the downhole tool 116. In some examples, the sensors 110, 112 may also rotate about the downhole tool 116 to capture 360-degree image data of the target component 106 and rig environment 100. The captured image data may be transmitted via wireless or wired technology for processing at the computing device 108. For example, the captured image data may be transmitted to a cloud-based system where the image data can be stored and/or computations performed. During processing, image rendering may be performed, an aspect ratio may be set, combined images may be generated, image recognition techniques may be applied, etc. For example, the dimensions of multiple images may be compared, altered, or combined. For instance, images from each of the sensors 110, 112, showing images captured from each side of the downhole tool 116, may be combined to show a 360-degree view of the downhole tool 116 and target component 106. The combined image rendered, or the individual images, may then be used to determine the location of the high-side marking of the directional tool 114.

Using calculations pre-programmed into the computing device 108, the computing device 108 can determine the angular offset between the location of the two high-side markings of the directional tool 114 and the downhole tool 116, otherwise referred to as the scribe line offset (SLO). The use of imaging data and computerized calculations helps significantly improve the accuracy of the SLO value, as opposed to conventional techniques that utilize line of sight alone. In addition, the placement of the sensing component 104 and the target component 106 within the rig environment can enable the real-time calculation of the SLO offsite, decreasing the number of crew members required onsite and improving the safety of the rig environment 100.

Further, each rendered image may be marked with a unique serial number and/or other identification information, such as information related to the equipment in the rig environment 100. Marked images may be stored for subsequent recall. Identifying and storing each rendered image helps keep a running log of each image used to calculate each SLO for accountability and use by the rig crew. In some examples, the rendered images may be stored in cloud-based storage, servers, or other storage applications.

In some examples, the placement of the sensing component 104 and the target component 106 may vary according to the rig environment, design considerations, etc. For example, the target component 106 could be mounted onto a tool located above the directional tool 114, such as a top-drive. In this example, the target component may still be aligned with a high-side marking of the directional tool 114 while mounted above the top-drive. In other examples, the sensing component 104 and target component 106 may be mobile. For instance, the sensing component 104 and the target component 106 may be implemented in conjunction with flight capable instruments, such as drone technology. In further examples, the sensing component 104 may be mounted on the directional tool 114 and the target component 106 may be mounted on the downhole tool 116.

In other embodiments, representing variations of the implementations shown in FIG. 1, an angular offset apparatus may implement a sensing component that includes one or more sensors designed to detect light from a target component, such as from lasers that are included in the target component. This embodiment is described in greater detail with respect to FIG. 6 below. Additional and/or alternative examples include detecting indicator(s) produced via non-visible light or various frequencies of electromagnetic radiation.

In still further embodiments, representing variations of the implementations shown in FIG. 1, an angular offset apparatus may implement a local positioning system. The local positioning system may implement one or more beacons or antennas, or other apparatuses capable of collecting and transmitting local positioning data. Each antenna may be located at the high-side of a drilling tool, such as the directional tool 114 and the downhole tool 116 illustrated in FIG. 1. In this embodiment, a grid system is determined and components of the local positioning system may be placed adjacent to known locations. For example, four local positioning components, may be placed adjacent to four corners of the drilling environment 100, with each of the four components placed adjacent to a known location. In other examples, any number and configuration of local positioning components may be implemented according to the unique drilling environment.

To calculate the SLO, each beacon or antenna may ping off the known locations and collect data, including the time period needed for the ping to travel to the local positioning component from each beacon or antenna, the time period needed for the ping to return to each beacon or antenna from the local positioning component, and information regarding where each beacon or antenna is located, such as the at the high-side marking of a drilling tool to which the antenna or beacon is attached. The collected data may then be provided to the computing device 108 and, utilizing the collected data, the angular offset, or SLO, is determined by the computing device 108. The SLO may then be accounted for in the well-bore plan and ultimately provided to the directional tool 114 via the computing device 108 to be accounted for during drilling operations.

Figure 2:
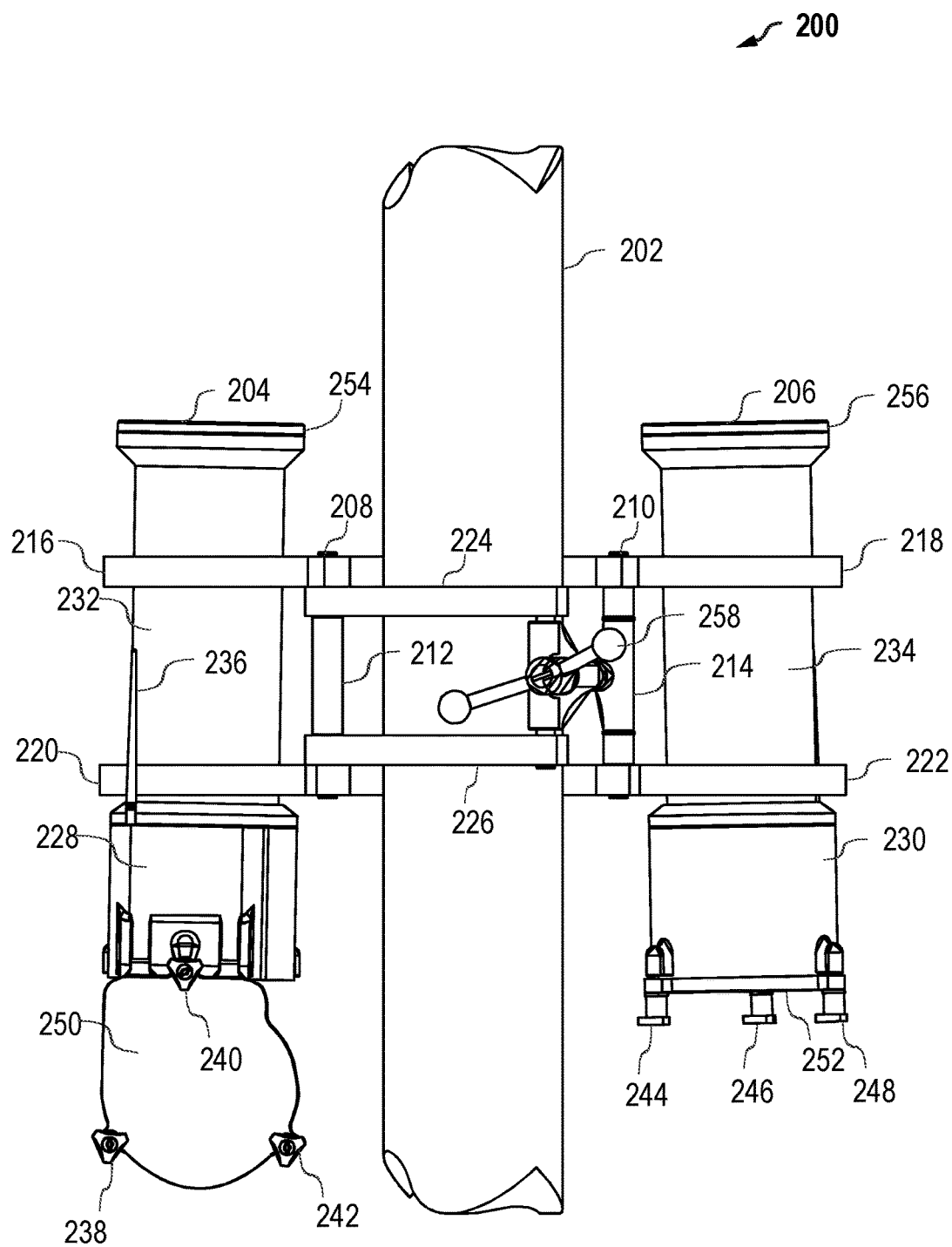
FIG. 2 illustrates a first side view of a sensing component of an angular offset apparatus according to some examples.

FIG. 2 illustrates a first side view of an example sensing component 200 of the angular offset apparatus (e.g., angular offset apparatus 102) described herein. The sensing component 200 is shown placed around the outside perimeter of a downhole tool 202 used during drilling operations, including during the picking up or laying down of the borehole assembly, which includes tooling such as a drilling motor or mud motor.

In this example, the sensing component 200 implements two imaging sensors 204, 206 configured to capture image content and placed adjacent to opposite ends of the downhole tool 202. One of the imaging sensors 204, 206, referred to as an origin camera, may be placed adjacent to the external high-side marking (not shown) of the downhole tool 202 to help determine an approximate origin location of the imaging sensors 204, 206. Knowing the origin location of the imaging sensors 204, 206 helps determine the scribe line offset (SLO) by providing information such as the location of the high-side marking of the downhole tool 202 (e.g., the origin of the offset of the rig) as well as helping to set the aspect ratio of the image content. In other embodiments, the imaging sensors 204, 206 may be placed away from the high-side marking of the downhole tool 202. In this embodiment, the offset between the sensors 204, 206 is determined and accounted for when calculating the SLO.

In some examples, the image content may include image data, captured by the imaging sensors 204, 206, showing a marker or indication of the location of a second high-side marking of another drilling tool, such as a directional tool, of the bottom hole assembly (BHA). The location of the directional tool high-side marking, along with the location of the high-side marking of the downhole tool 202, may be used to determine the SLO, sometimes referred to as the angular offset, of the two high-side markings with increased precision and accuracy.

In the illustrated example, the sensing component 200 is shown attached to the downhole tool 202 at an external high-side marking (not shown). To attach the sensing component 200 to the downhole tool 202, the sensing component 200 implements a mounting mechanism that can be latched and unlatched for attachment and removal, respectfully, of the sensing component 200. The mounting mechanism may implement one or more attachment fasteners 208, 210, one or more transport mechanisms 212, 214, one or more mounting brackets 216, 218, 220, 222, and one or more connecting brackets 224, 226. The mounting mechanism helps ensure that that sensing component 200 is aligned with the center line of the downhole drilling 202 when mounted.

In some examples, the attachment fasteners 208, 210 are located on the mounting mechanism and configured to secure the components of the mounting mechanism in the desired configuration. In this example, the attachment fasteners 208, 210 include a bolt assembly. However, any fastener meeting the weight and safety requirements of the sensing component 200 and the rig environment may be used.

In addition, the transport mechanisms 212, 214 may allow for a user, such as a rig employee, to transport the sensing component 200 for placement on the downhole tool 202. For example, the transport mechanisms 212, 214 may include one or more handle grips. The sensing component may be lifted manually by the one or more transport mechanisms 212, 214, or via machinery utilizing the transport mechanisms 212, 214, depending on the drilling rig, weight of the sensing component 200, difficulty of placement, and safety considerations. The transport mechanisms 212, 214 may also be configured to allow for rotation of components of the mounting mechanism, such as the mounting brackets 216, 218, 220, 222.

In some instances, the connecting brackets 224, 226 may be located at a first end and a second end of the transport mechanisms 212, 214. The connecting brackets 224, 226 may be opened or closed to allow for the attachment and removal of the sensing component 200. The connecting brackets 224, 226 may run parallel to the imaging sensors 204, 206 and may serve as the connecting structure between the two imaging sensors 204, 206.

Further, the mounting brackets 216, 218, 220, 222, may include a disc or ring that wraps around exterior housings 228, 230, 232, 234 of the imaging sensors 204, 206. The mounting brackets 216, 218, 220, 222 are configured to hold the imaging sensors 204, 206 at a fixed location and prevent migration. The mounting brackets 216, 218, 220, 222 may be permanently fixed to the exterior housings 228, 230, 232, 234 or may be detachable, allowing for the placement and removal of the imaging sensors 204, 206. In some examples, exterior housings 228, 230, 232, 234 may be placed on the external body of the imaging sensors 204, 206 and may serve as a protective outer housing, or explosion-proof housing.

In addition, while the sensing component 200 illustrated in FIG. 2 is removable, alternative examples may include a sensing component 200 that is permanently attached to a drilling tool. Also, the sensing component 200 may not implement a mounting mechanism and may be attached to the downhole tool 202 via alternative attachment means. For example, the mounting mechanism may be a separate component, independent of the sensing component 200, that may be attached to the downhole tool or may be manufactured as a part of the downhole tool. The sensing component 200 may also be modular in nature, and may be attached to the independent mounting mechanism at a later time. For example, the sensing component 200 may implement numerous sensors that each may be attached separately to a mounting mechanism.

Still further, the sensing component 200 may be attached to the downhole tool 202 by other attachment or mounting means. For example, the sensing component 200 could be attached to the downhole tool 200 by a spring-loading mounting mechanism. The spring-loading mounting mechanism may implement a collar with one or more springs that allows the sensing component 200 to be attached to downhole tools varying in diameter. In addition, the sensing component 200 may be attached to downhole tools with straps or magnetic components that can be placed around the exterior of the downhole tool 202.

In some examples, the sensing component 200 may also implement a wireless antenna 236. The wireless antenna 236 is shown mounted to the exterior housing 228, in this particular example. However, the wireless antenna 236 may be placed adjacent to any location on the sensing component 200 where the wireless antenna 236 is able to transmit wireless signal data. In some examples, the sensing component 200 may not implement a wireless antenna 236 at all, but instead may implement other wireless technology, such as short range or long range wireless communication.

The sensing component 200 may also implement one or more imaging sensor backplates 250, 252. The imaging sensor backplates 250, 252 may include a transparent panel, such as a glass or plastic plate, that may be hinged to allow for opening and closing. The imaging sensor backplates 250, 252 may be placed over one or more control panels operable to control the imaging sensors 204, 206. The control panel(s) may include manual control components such as a thumbpad. The control panel(s) may be used for manual control of the imaging sensors 204, 206 should wireless control become disabled or unavailable. For example, each control panel may be used to activate wireless components, power components, etc. of the imaging sensors 204, 206. In addition, the imaging sensor backplates 250, 252 may implement one or more backplate fasteners 238, 240, 242, 244, 246, 248. The backplate fasteners 238, 240, 242, 244, 246, 248 may be configured to secure the imaging sensor backplates 250, 252 in a closed position, or allow the imaging backplates 250, 252 to be moved to an open position.

In further examples, the sensing component may implement one or more protective lenses 254, 256. The protective lenses 254, 256 may be configured to attach over a surface of the imaging sensors 204, 206 to prevent foreign substances, such as water or oil, from penetrating the imaging sensors 204, 206. The protective lenses 254, 256 may include an acrylic glass panel, but other materials may be used depending on the drilling environment, the product being produced, the imaging component being protected, and other considerations.

In some instances, the sensing component may implement a rotatable handle 258. The rotatable handle 258 may be configured to spin freely on a threading system to secure the mounting mechanism to the downhole tool 202, or allow the removal of the mounting mechanism. The rotatable handle 258 may enable the tightening and loosening of the mounting mechanism. In particular, the rotatable handle 258 may close or open the connecting brackets 224, 226 for attachment and removal, respectively, of the sensing component 200 to the downhole tool 202. The rotatable handle 258 may be permanently fixed to the sensing component 200 or may be detachable, dependent on the sensing component 200 configuration. In other examples, another suitable fastening component may be used in lieu of the rotatable handle 258.

The exact number and arrangement of the sensing component 200 components described above may vary according to the specific angular offset apparatus, drilling rig configuration, and other considerations. For example, in the illustrated example, the sensing component 200 implements two imaging sensors 204, 206 and thus implements four mounting brackets 216, 218, 220, 222, located at opposite ends of the imaging sensors 204, 206. In other examples, the sensing component may implement one imaging sensors, rotatable around the exterior of the downhole tool 202, to allow for a 360-degree image, and may implement only one mounting bracket, as described below with regard to the embodiment of FIG. 10. Or, the sensing component may implement some other plurality (e.g., three, four, eight, twenty, etc.) of imaging sensors, which can be stationary or rotatable, which may result in a different configuration of mounting bracket(s). Thus, since other sensing component 200 configurations may implement a different number of sensors or the sensors may have a different arrangement, varied components may be implemented.

Note that the design and implementation of the angular offset apparatus shown in FIG. 2 is not a limiting embodiment. Other designs may be considered and implemented according to the environment, requirement, and design considerations described herein.

Figure 3:
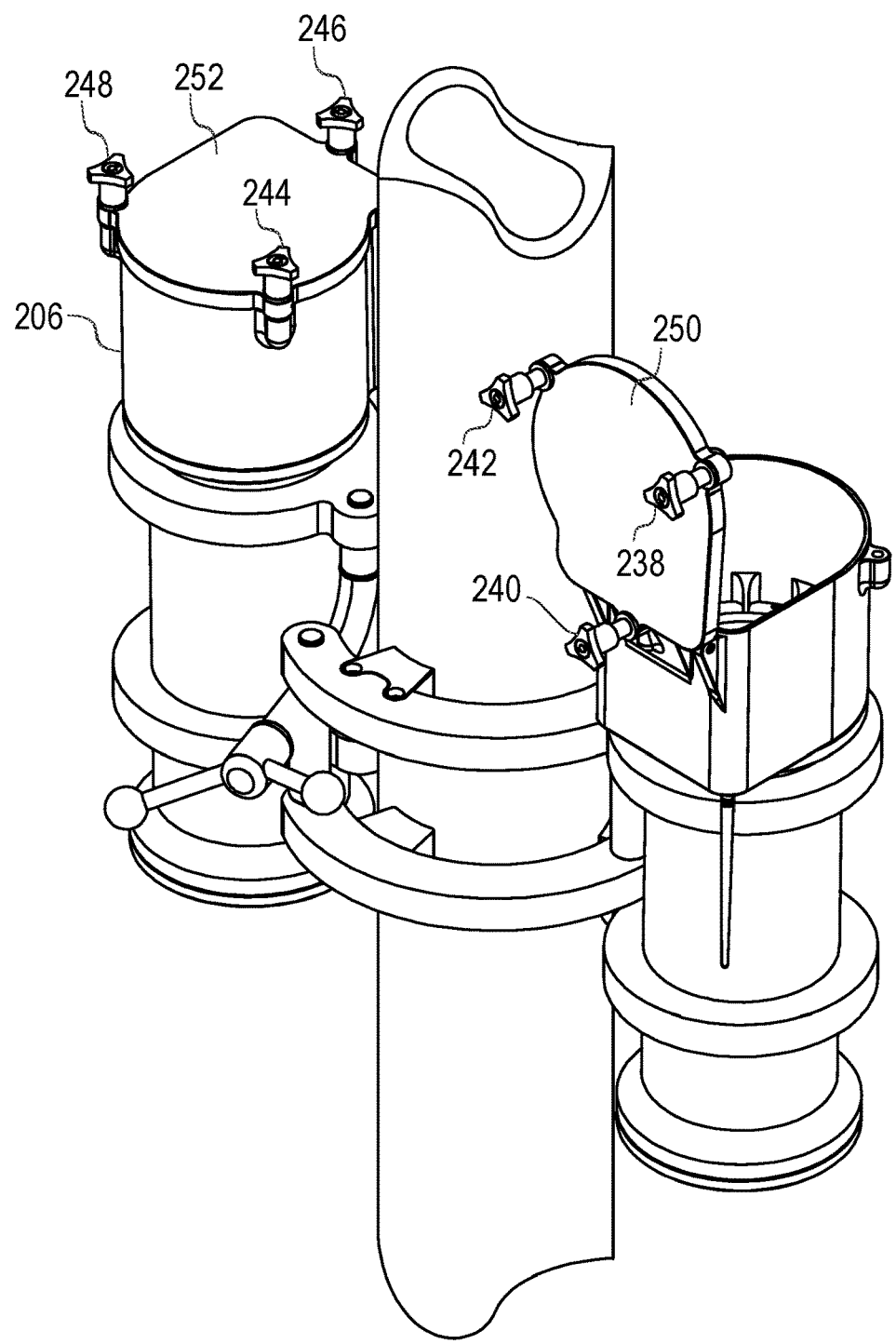
FIG. 3 illustrates a first perspective view of the sensing component of FIG. 2.

FIG. 3 illustrates a first perspective view of the sensing component of FIG. 2. In the illustrated example, one of the imaging backplates 250 is shown in an open configuration and the other imaging backplate 252 shown in a closed configuration. The open configuration of imaging backplate 250 shows the backplate fasteners 238, 240, 242 in an unfastened, or loosened, position, allowing the imaging backplate 250 to be opened to expose a control panel. The control panel allows manual control of the imaging sensor 204 if remote control is disabled or unavailable. The closed configuration of imaging backplate 252 shows the backplate fasteners 244, 246, 248 in the fastened, or tightened, position, ensuring that the imaging backplate 252 remains in the closed position. When the imaging backplate 252 is in the closed position, the control panel of the imaging sensor 206 is not exposed to the rig environment and manipulation of or damage to the control panel is minimized.

In other examples, other materials and structures may be used for placement over the control panel(s). For example, the imaging backplates 250, 252 may be fixed in the closed position and controlled wirelessly. In some examples, a larger or smaller component may be placed over the control panel(s). In further examples, the imaging backplates 250, 252 may include high compressive strength and tensile resistant materials.

FIG. 4A illustrates a second perspective view of the sensing component 200 of FIG. 2 in an unlatched configuration. In the illustrated example, the rotatable handle 258 is rotated to allow the mounting mechanism to be in the unlatched configuration. The unlatched configuration allows for the connecting brackets 224, 226 to be expanded open and for the sensing component 200 to be removed from the downhole tool 202. When the connecting brackets 224, 226 are in the opened/unlatched configuration, they are able to receive the downhole tool 202.

FIG. 4B illustrates a third perspective view of the sensing component of FIG. 2 in a latched configuration. In this example, the rotatable handle 258 is rotated to allow the mounting mechanism to be in the latched configuration. The latched configuration allows for the connecting brackets 224, 226 to be rotated to a closed position and for the sensing component 200 to be securely mounted to the downhole tool 202.

For example, the mounting mechanism may implement a sensing component latching mechanism 404 located adjacent to the rotatable handle 258 and operable by way of the rotatable handle 258. For example, the latching mechanism may include a threaded bolting system that is loosened or tightened, or opened or closed, by way of the rotatable handle 258. In other examples, other latching mechanisms may be used such as magnets, brackets, straps, etc.

In addition, in FIGS. 4A and 4B, at least one of the connecting brackets 224, 226 may implement an indicator. For example, in the illustrated examples, connecting bracket 252 implements an arrow 402. The arrow 402, may be utilized to indicate a location of interest. In one example, the arrow 402 may indicate the location of a high-side marking of the downhole tool 202. The arrow 402, enables the sensing component 200 to be aligned with the high-side marking. The alignment of the arrow 402 with the high-side marking may be manual or automated. For example, the arrow 402 may be placed adjacent to the high-side marking by a rig employee.

In some examples, one of the imaging sensors 204, 206 may be aligned with the arrow 402, to serve as an origin point for the SLO calculations. In other examples, the imaging sensors 204, 206 may be located at other locations along the connecting brackets 224, 226 or within the rig environment. In these examples, the connecting brackets 224, 226 may also include one or more indicators that represent a unit of measurement, such as an angular increment, that can be used to determine the offset between the imaging sensors 204, 206 and the arrow 402. The offset between the imaging sensors 204, 206 and the arrow 402, indicating the high-side marking of the downhole tool 202, may then be accounted for in the SLO calculation.

In other examples, the sensing component 200 may implement one or more alignment sensors that can help determine if the arrow 402 is aligned with the high-side marking. In one instance, the alignment sensor(s) may collect image data of the placement of the sensing component 200 at the downhole tool 202. In this example, the alignment sensor(s) may be located on the top surface or bottom surface of the sensing component 200, or placed adjacent to the inner portion of the sensing component 200. The image data may be processed to verify whether the sensing component 200 is aligned with a high-side marking of the downhole tool 202. In the case of improper alignment, the sensing component 200 may be manually re-aligned. Alternatively, the image data may be analyzed and, along with an electronic alignment mechanism, may allow for an automated re-alignment of the sensing component 200 or manual re-alignment, via an onsite employee or a remote device operated by an offsite employee, to align the sensing component with the high-side marking of the downhole tool 202. For instance, one of the sensors 204, 206 or the arrow 402 of the sensing component 200 may be aligned with the high-side marking of the downhole tool 202.

Figure 5A:
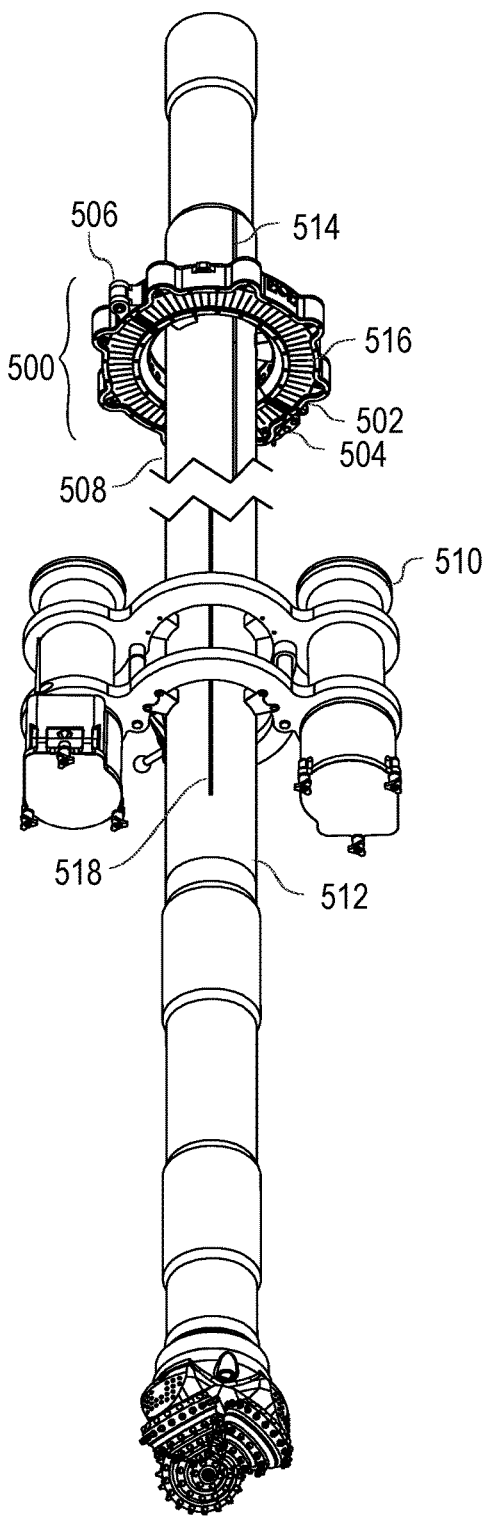
FIG. 5A illustrates an example drilling assembly implementing a target component of an angular offset apparatus according to some examples.

FIG. 5A illustrates an example drilling assembly implementing a target component 500 of an angular offset apparatus according to some examples. In the illustrated example, the target component 500 includes a collar 502, a target component latching mechanism 504, and a hinge mechanism 506. The target component 500 is shown mounted at the directional tool 508, located above a sensing component 510 mounted at a downhole tool 512. However, in other embodiments, the target component 500 may be located below the sensing component 510 or elsewhere on the rig, depending on the rig configuration.

In some examples, the hinge mechanism 506 of the target component 500 is configured to allow the target component 500 to open when the target component latching mechanism 504 is unsecured. For instance, when the target component latching mechanism 504 is in the unsecured configuration, the target component 500 may hinge at the hinging mechanism 506 to create an opening in, or separation of, the target component to allow for placement or removal of the target component 500. The opening allows for the target component 500 to be placed around the outer diameter of the directional tool 508.

Once the target component 500 is placed around the directional tool 508, the target component 500 is aligned with the directional tool high-side marking 514. Once aligned, the target component 500 may hinge to the closed position and secured in place with the target component latching mechanism 504. The target component 500 may also be secured in place adjacent to the directional tool 508 by other attachment mechanisms such as magnets, straps, a bolting mechanism, etc.

In this example, the target component 500 is manually aligned with the directional tool high-side marking 514. However, in other examples, the target component 500 may be remotely and/or automatically aligned. For example, the target component 500 may include one or more sensors, such as imaging sensors, that may collect image data associated with the placement of the target component 500. The image data may be analyzed and used for aligning the target component 500 automatically and/or remotely. For instance, a unique marking of the target component may be aligned with the directional tool high-side marking 514 automatically and/or remotely.

In some examples, the target component 500 may also include one or more markings 516 on a surface of the target component 500 visible to the sensing component 510. The marking(s) 516 may indicate a pre-determined value that can be used to calculate the scribe line offset (SLO) between the downhole tool high-side marking 518 and the directional tool high-side marking 514. For example, each marking of the marking(s) 516 may represent a certain degree increment of the 360 degrees of the target component 500. The downhole tool high-side marking 518 may serve as the origin point for the SLO calculation. The SLO may be calculated by measuring the marking(s) 516, representative of a certain degree value, defining the offset between the downhole tool high-side marking 518 and the directional tool high side marking 514.

In other examples, the high-side markings 514, 518 may be implemented as any identifying component. For example, the high-side markings 514, 518 may include an identifier of any shape, size, and material, such as an arrow or lighted indicator. In addition, the high-side markings 514, 518 may include a separate identifier that can be placed on a drilling tool at any time to indicate the high-side of the tool.

Figure 5B:
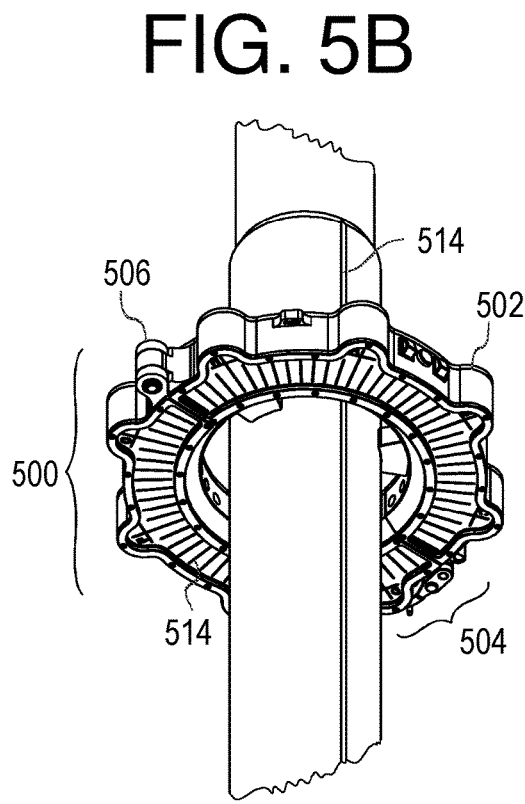
FIG. 5B illustrates a perspective view of the target component of FIG. 5A.

FIG. 5B illustrates a perspective view of the bottom surface of the target component 500 of FIG. 5A. The target component 500 includes the collar 502, the target component latching mechanism 504, and the hinge mechanism 506. The target component 500 also includes marking(s) 516, representative of a pre-determined degree value, used to calculated the SLO between the directional tool high-side marking 514 and the downhole tool high-side marking 518.

While degree values are used in the illustrated example, any form of measurement may be used in conjunction with the marking(s) 516 and, subsequently, the SLO. For example, units of length, diameter, inner diameter, etc. may be used to divide and mark the target component 500 into pre-determined units measurable to determine the SLO between the directional tool high-side marking 514 and the downhole tool high-side marking 518.

Figure 5C:
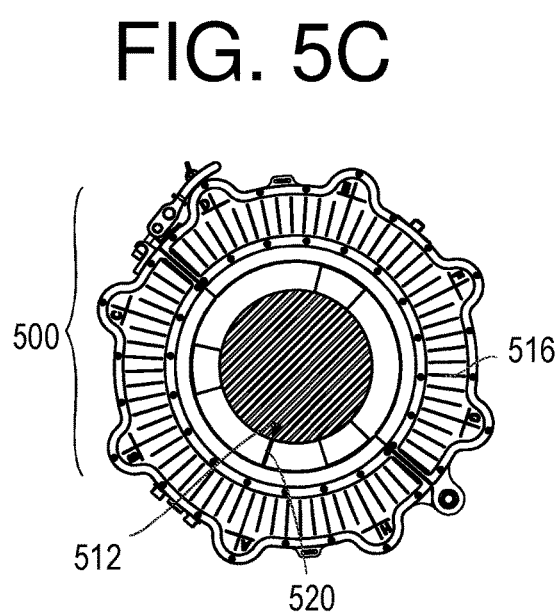
FIG. 5C illustrates a perspective view of the bottom surface of the target component of FIG. 5A.

FIG. 5C illustrates another perspective view of a bottom surface of the target component 500 of FIG. 5A. The target component 500 includes one or more markings 516 indicating a degree value of the 360 degrees of the target component 500. The marking(s) 516 may also have labeled reference points, which are indicated by the letters "A-H" in the illustrated example. However, any labels may be used.

In this example, the target component 500 further implements a laser component (not shown) that emits a light beam 520. The light beam 520 indicates the location of the directional tool high-side marking 514. The light beam 520 may ensure proper alignment between the target component 500 and the directional tool high-side marking 514. For example, the light beam 520 may also be detected by one or more sensing components located on the sensing component 510. The sensing component data may be analyzed to ensure that the light beam 520 is aligned with the directional tool high-side marking 514. Proper alignment maximizes accuracy for calculating the SLO between the directional tool 508 and the downhole tool 512.

In other examples, the target component 500 may implement other components to indicate the directional tool high-side marking 514. For example, the target component 500 may implement a unique marking, such as a marking with a cross-hair, an LED light, or any other marking or indicator visible to the sensing component 510 and able to be detected by the sensor(s) of the sensing component 510.

Figure 6:
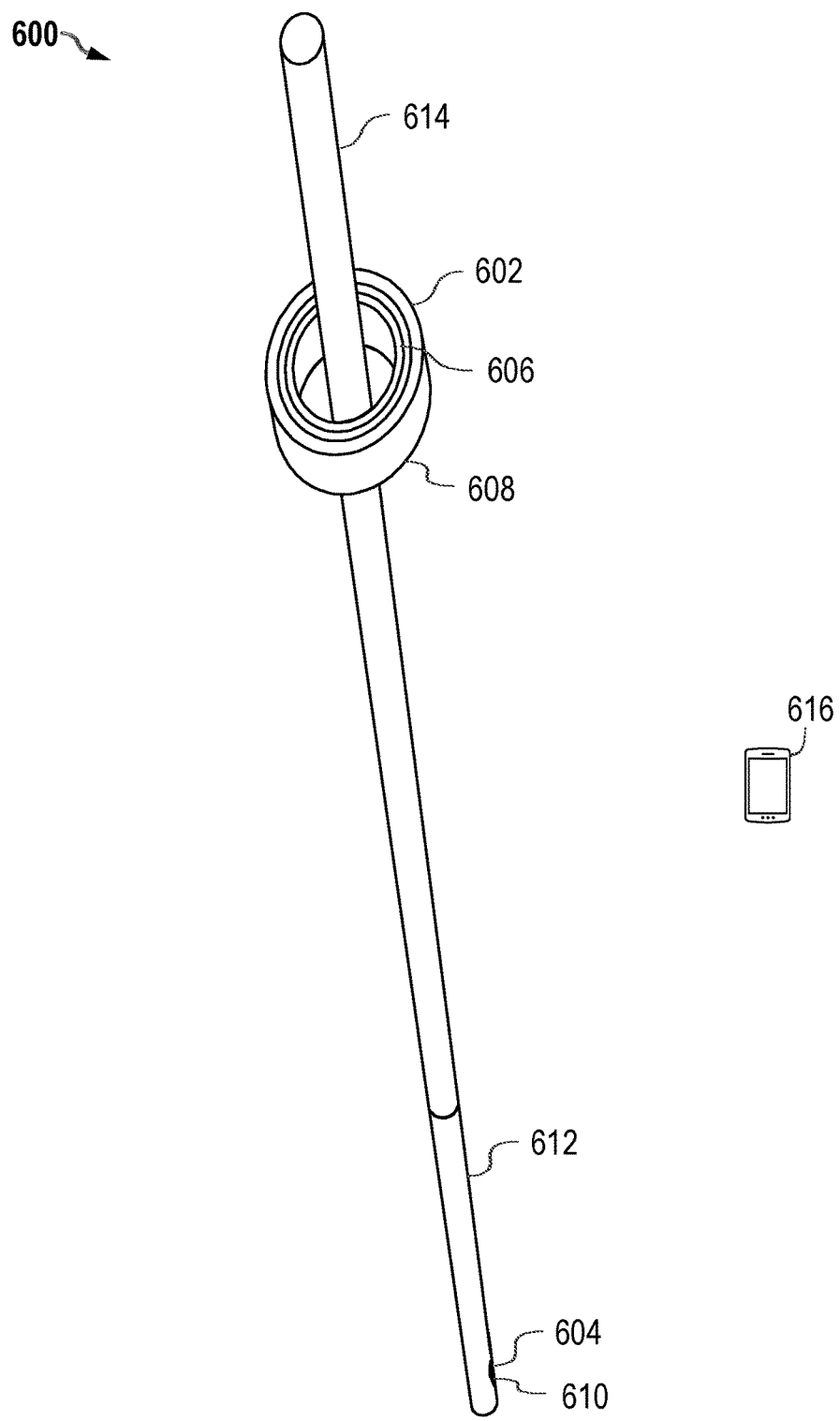
FIG. 6 illustrates a perspective view of an example drilling assembly implementing another embodiment of an angular offset apparatus according to some examples.

FIG. 6 illustrates a perspective view of an example drilling assembly implementing another embodiment of an angular offset apparatus 600. In the illustrated example, the angular offset apparatus 600 includes a collar component 602 and a marking component 604. The collar component 602 may include a mounting mechanism 606 and one or more light projecting components 608. The marking component 604 may include one or more sensor(s) 610.

In some examples, the collar component 602 may implement a mounting mechanism 606 that includes one or more spring-loaded mounting mechanisms located on the inner diameter of the collar component 602. The spring-loaded mounting mechanisms may expand and contract to allow mounting of the collar component 602 to drilling tools of varied diameters and configurations. The collar component 602 may also implement one or more light projecting components 608 located on a bottom surface of the collar component 602. For example, the collar component 602 may implement one or more lasers configured to project light in a downward direction towards the marking component 604.

The marking component 604 may implement one or more sensor(s) 610 configured to detect light projected from the light projecting component(s) 608 and collect associated light data. For example, the marking component 604 may implement one or more sensor(s) 610 aligned with the high-side marking of the downhole tool 612 to indicate the high-side marking. The collar component 602 may be mounted at a high-side marking (not shown) of the directional tool 614, with at least one light projecting component directly aligned with the high-side marking of the directional tool 614 at the start of a rotation, and thus being used as the light projecting origin point.

In some examples, to calculate the angular offset, or SLO, the collar component 602 may rotate about the drilling assembly, at a fixed location, and the sensor(s) 610 may be configured to detect when the light projecting component(s) 608 pass the sensor(s) 610 and collect light data associated with the detection. The light data may be transmitted, either via wired or wireless technology, to a computing device 616 for processing. The light data may be analyzed to determine at what degree of rotation of the collar component 602 the sensor(s) 610 detected the light from the light projecting component(s) 608. From this analyzed light data, along with the known light projecting origin point, the SLO may be calculated for use in directional drilling operations.

In further examples, the collar component 602 may be fixed and the marking component 604 may rotate. For example, the collar component 602 may have one or more light projecting components 608 fixed at the high-side marking of the directional tool 614. The marking component 604 may rotate about the downhole tool 612 and the sensor(s) 610 may collect data including when the sensor(s) 610 detect light projected from the light projecting component(s) 608. The marking component 604 may include one or more sensor(s) 610 aligned with the high-side of the downhole tool 612 at the start of rotation, serving as the known sensor origin point. In some examples, the rotation may take place by way of a bearing system, magnetic tracks, a gear and motor unit, or automatically via other mechanical means.

The collected data may be transmitted, either via wired or wireless technology, to a computing device 616 for processing. The data may be analyzed to determine at what degree of rotation the sensor(s) 610 of the marking component 604 detected light emitted from the light projecting component(s) 608. From this analyzed light data, along with the known sensor origin point, the SLO may be calculated.

In the illustrated example, the collar component 602 is mounted on a directional tool 614 and the marking component 604 is mounted on a downhole tool 612. However, in some embodiments, the collar component 602 and the downhole tool 612 may be mounted at different locations, depending on weight requirements, safety considerations, the rig environment and tooling, and other considerations. For example, the collar component 602 may be mounted at the downhole tool 612 and the marking component 604 may be mounted at the directional tool 614.

In other examples, the sensor(s) 610 may be replaced with reflective surfaces, such as mirrors or any other material with a mirror finish, that are able to reflect light from the light projecting component(s) 608 back towards the collar component 602. In this example, the collar component 602 may implement one or more sensors able to detect light from the light projecting component(s) 608 to calculate the SLO. In addition, the collar component 602 may also implement other components such as a protective housing.

Figure 7:
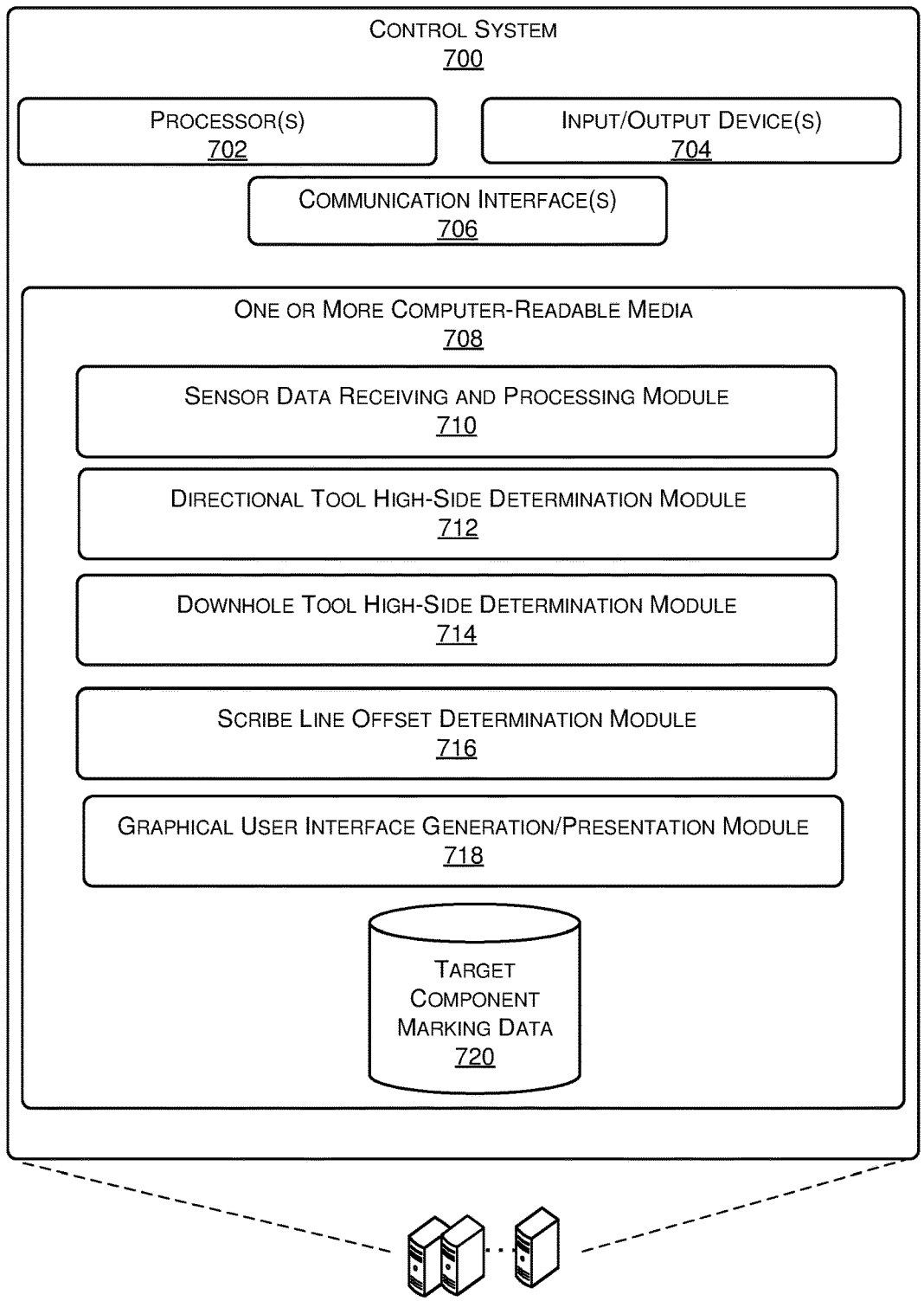
FIG. 7 illustrates an example architecture of the control system of the angular offset apparatus of FIG. 1.

FIG. 7 illustrates an example architecture of a control system 700 that can include one or more computing devices. In some cases, the control system 700 can include the computing device 108 of FIG. 1. The computing device may include, for example, a mobile phone, a tablet, a laptop computer, a desktop computer, an electronic notepad, a server computing device, etc. In additional implementations, the control system 700 can be implemented in a cloud-computing architecture. The control system 700, collectively comprises processing resources, as represented by processor(s) 702, input/output device(s) 704, communication interface(s) 706, and one or more computer-readable storage media 708.

Processor(s) 702 can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 702 can execute one or more modules and/or processes to cause computing device(s) to perform a variety of functionalities, as set forth above and explained in further detail in the following disclosure. Additionally, each of the processor(s) 702 can possess its own local memory, which also can store program modules, program data, and/or one or more operating systems.

The computer-readable storage media 708 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may also be stored within the one or more computer-readable media 708 and configured to execute on the processor(s) 702. For example, the one or more computer-readable media 708 may store a sensor data receiving and processing module 710, a directional tool high-side determination module 712, a downhole tool high-side determination module 714, a scribe line offset (SLO) determination module 716, and a graphical user interface (GUI) generation/presentation module 718. The one or more computer-readable media 708 may also store data, such as target component marking data 720, that includes data related to markings on the target component such as the unit of measurement, increment value, etc.

Figure 11:
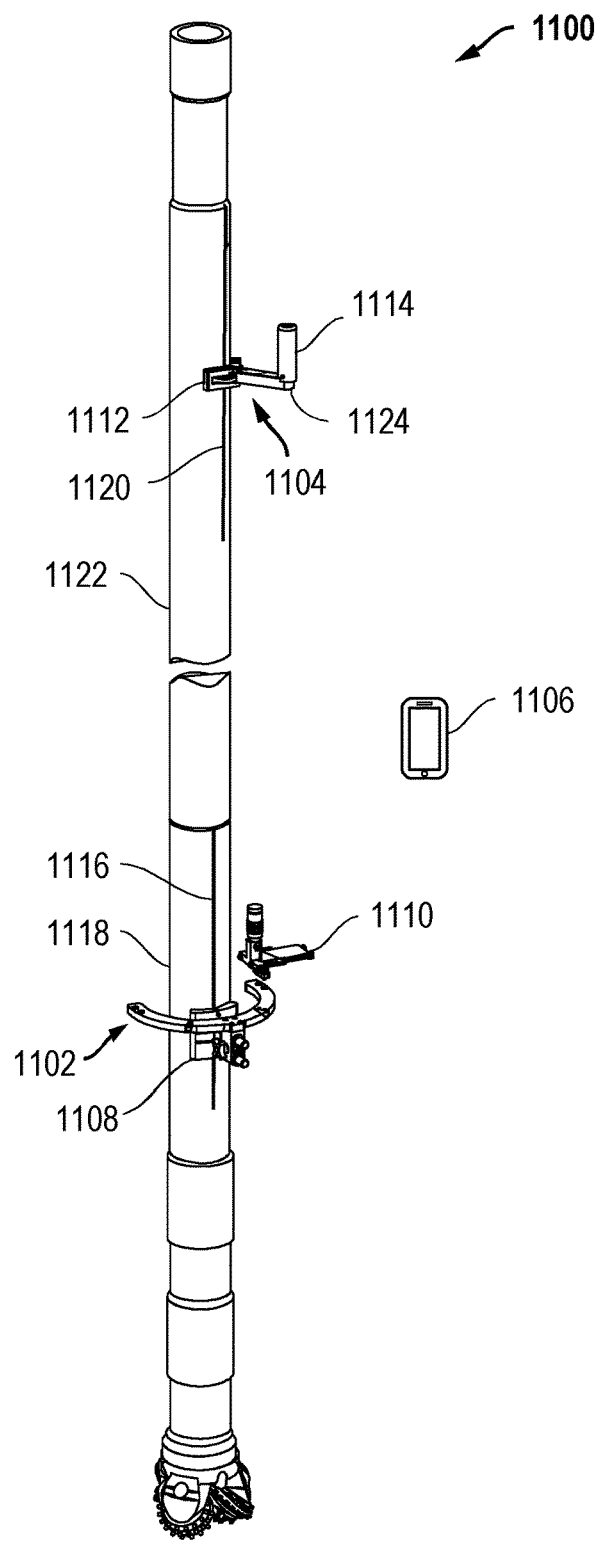
FIG. 11 illustrates a perspective view of an example drilling assembly implementing another embodiment of an angular offset apparatus according to some examples.
Figure 12:
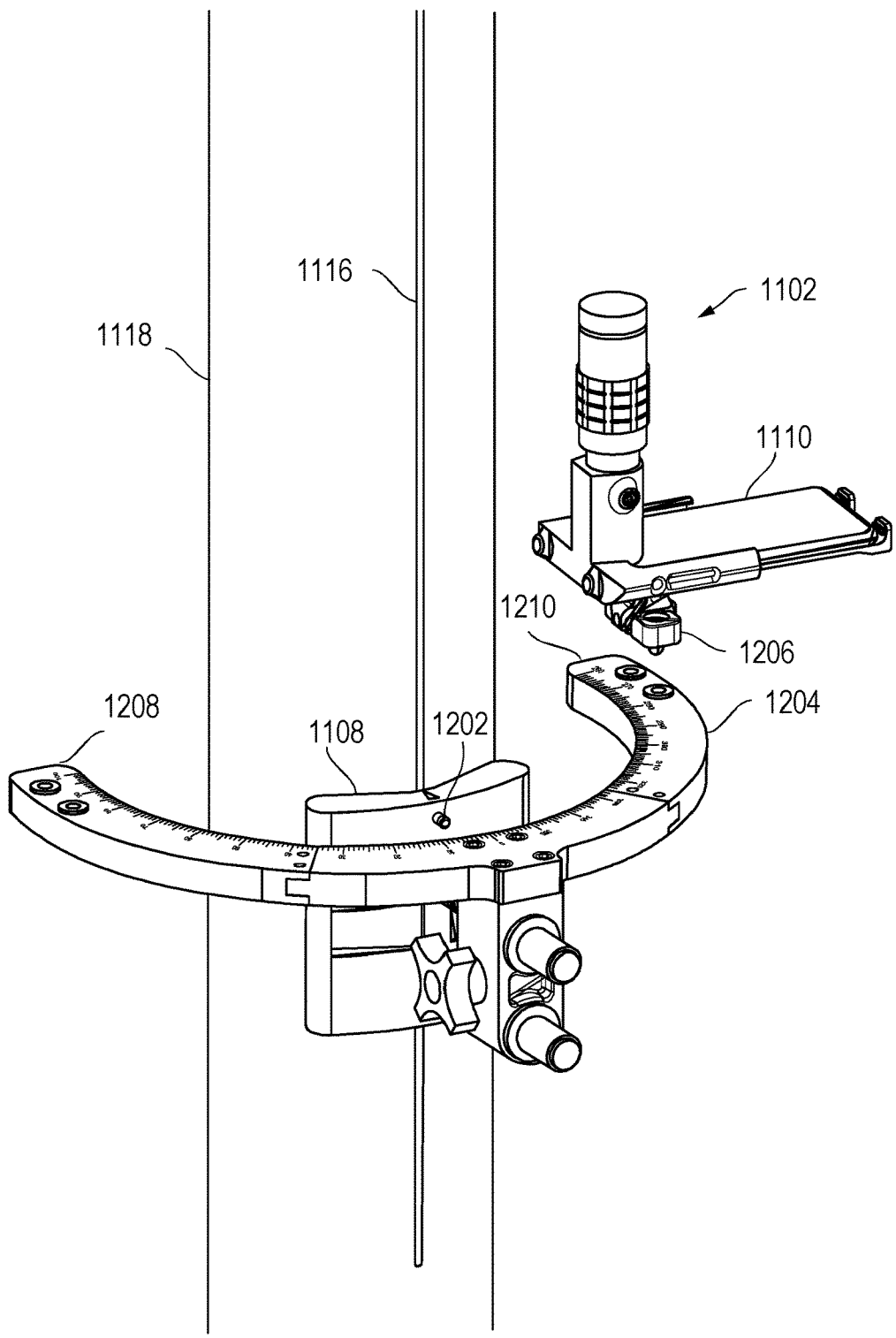
FIG. 12 illustrates a side view of the sensing component of the angular offset apparatus of FIG. 11.

In some examples, the sensor data receiving and processing module 710 is configured to receive and process sensor data from a sensing component, such as the sensing component 104 of FIG. 1, the sensing component 1102 of FIGS. 11 and 12, and any other sensing component embodiments described herein. For example, the sensors 110, 112 of the sensing component 104 (and/or the imaging device 1110 of the sensing component 1102) may collect image data that is transmitted to the control system 700 via wired or wireless means. The sensor data receiving and processing module 710 may receive the image data and process the data. Processing the data may include parsing the image data for quality, compiling a number of images into a composite image, dimensional analysis, mechanical analysis, nondestructive testing, nondestructive evaluation, maintenance analysis, fatigue and failure analysis, etc. Further, each image or composite image may be marked with a unique serial number and/or other identification information, such as information related to the equipment in the rig environment. Marked images may be stored for subsequent recall. Identifying and storing each rendered image helps keep a running log of each image used to calculate each SLO for accountability and use by the rig crew. Storage may take place on a server system, cloud-based storage platforms, or other storage applications.

In further examples, the directional tool high-side determination module 712 may use the processed image data, to determine the location of the high-side marking of the directional tool, such as directional tool 114 or directional tool 1122. For example, the directional tool high-side determination module 712 may use processed image data, such as a composite image, showing the high-side marking of the directional tool 114, or an indicator located on the target component 106, to determine the location of the high-side of the directional tool 114. In another example, the directional tool high-side determination module 712 may use processed image data (the image data received from the sensing component 1102) showing the directional tool high-side marking 1120 of the directional tool 1122 to determine the location of the high-side of the directional tool 1122. In some examples, various alignment mechanisms may be used, as well as user selections, to ensure the proper determination of the high-side marking of the directional tool. For example, a user may select various boundary points, in a graphical user interface, to align the composite image with an overlay image or axis to determine the correct location of the high-side marking of the directional tool.

The downhole tool high-side determination module 714 may use the processed image data (e.g., composite image data, enhanced quality image data, etc.), to determine the location of the high-side marking of the downhole tool, such as downhole tool 116 or downhole tool 1118. For example, one of the sensors of the sensing component 104 may be aligned with the high-side marking of the downhole tool 116. Thus, the location is determined by analyzing the image data from the sensing component 104 aligned with the high-side marking of the downhole tool 116, where a horizontal axis of the image is therefore aligned with the high-side marking of the downhole tool 116. In other examples, various sensors may collect data from the inner diameter of the sensing component 104 to determine the location of the high-side marking of the downhole tool 116. For instance, one or more imaging sensors, such as cameras, may be placed in a way to allow collection of image data of the exterior of the downhole tool 116. In still further examples, the sensing component 104 may have an indicator aligned with the high-side marking of the downhole tool 116. Sensor data associated with the indicator may be used to determine the location of the high-side marking of the downhole tool 116 or the offset between the indicator and the sensors of the sensing component 104. For instance, one or more imaging components may be configured to collect image data of the location of the indicator.

In other examples, the imaging device 1110 may be configured to extend and contract, via one or more dowels of the imaging device mount 1206, to collect image data depicting the location of the downhole tool high-side marking 1116 of the downhole tool 1118. In additional examples, the imaging device 1110 may include one or more imaging sensors located on various surfaces of the imaging device 1110 to allow the imaging device 1110 to collect image data depicting the location of the downhole tool high-side marking 1116 of the downhole tool 1118. Still further, the imaging device 1110 of the sensing component 1102 may be mounted at a fixed location (e.g., 90-degrees or at another fixed/known angle along the measuring instrument 1204) from the downhole tool high-side marking 1116 of the downhole tool 1118. Thus, the location of the high-side marking of the downhole tool 1118 is determined based in part on analyzing the image data from the sensing component 1102 and/or based on the alignment of the imaging device 1110 at a fixed location from downhole tool high-side marking 1116 of the downhole tool 1118.

The scribe line offset determination module 716 may then use the determined directional tool high-side marking location and the downhole tool high-side marking location to determine the SLO, or angular offset between the high-sides of the directional tool and the downhole tool. The SLO may be determined using trigonometric functions and analysis, in some examples.

The graphical user interface (GUI) generation/presentation module 718 may generate and cause the presentation of graphical user interface(s). For example, the GUI generation/presentation module 718 may generate and cause the presentation of the graphical user interface(s) describe below with reference to FIGS. 8A-C.

As noted above, the control system 700 may include one or more input or output devices. The input/output device(s) 704 may include one or more user display screens that enable a user to select at least a portion of an image that is used by the sensor data receiving and processing module 710, directional tool high-side determination module 712, downhole tool high-side determination module 714, and scribe line offset determination module 716 to calculate the SLO. Examples of the various input/output device(s) 704 are described in greater detail with respect to FIGS. 8A-C below.

In addition, in some examples the control system 700 may also include one or more communication interfaces 706, which may support both wired and wireless connection to various networks, such as cellular networks, radio, short range or long range wireless communication networks, short range or near-field networks (e.g., Bluetooth®), infrared signals, local area networks, wide area networks, the Internet, and so forth. For example, the communication interface(s) 706 may allow the computing device 700 to provide the SLO determined by the scribe line offset determination module 716 to the directional tool 114.

Figure 8A:
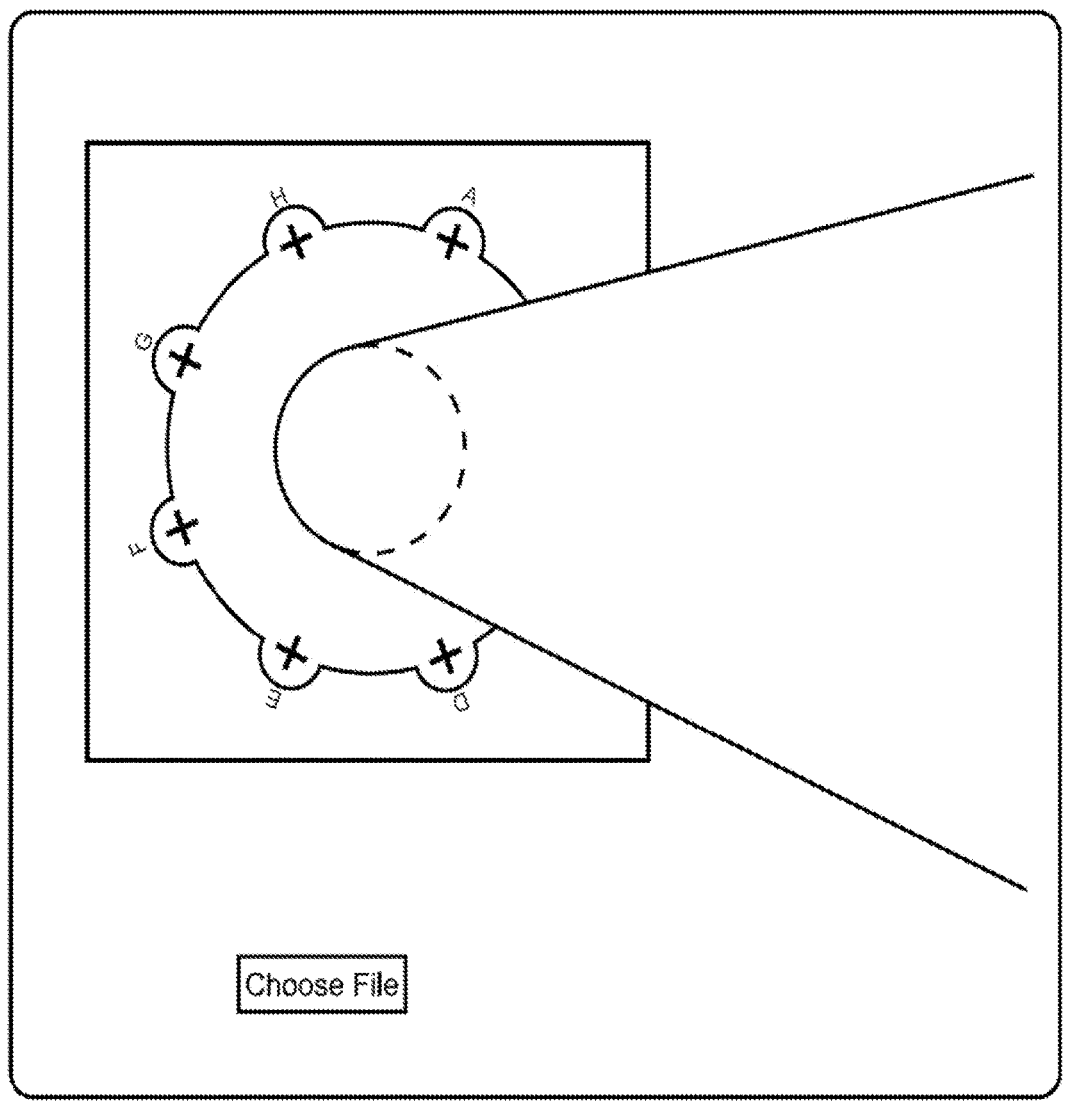
FIG. 8A illustrates an example graphical user interface implemented with the example architecture of FIG. 7.
Figure 8B:
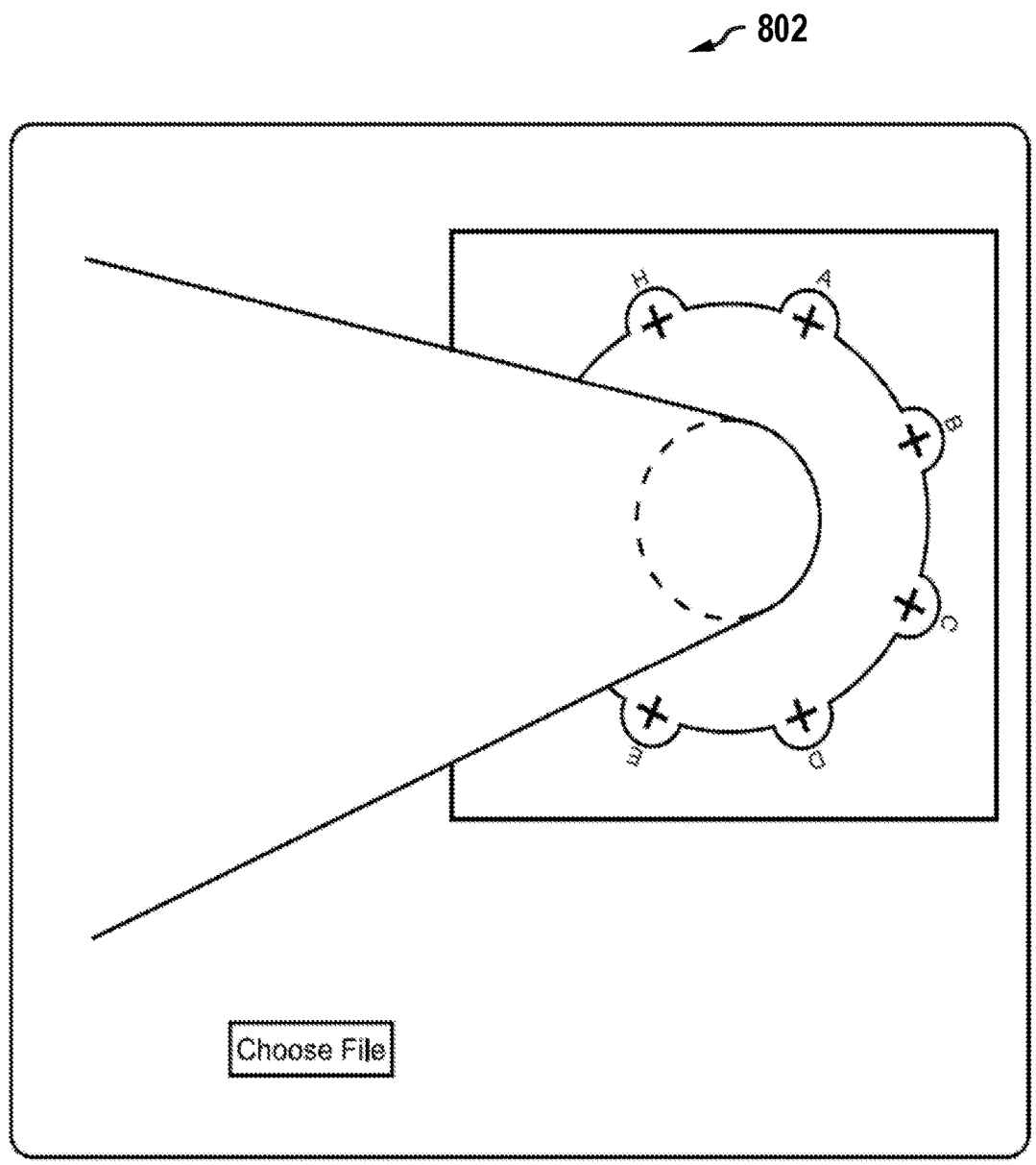
FIG. 8B illustrates another example graphical user interface implemented with the example architecture of FIG. 7.
Figure 8C:
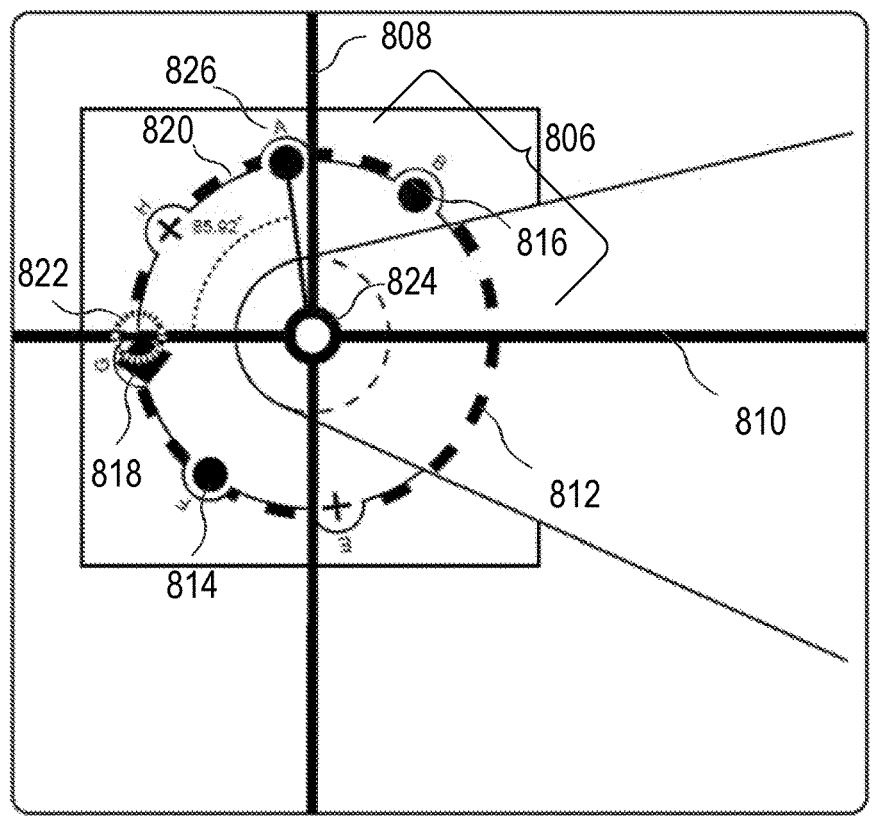
FIG. 8C illustrates another example graphical user interface implemented with the example architecture of FIG. 7.

FIGS. 8A-C illustrate various graphical user interface examples 800, 802, 804 that can be presented via the input/output device(s) 704 as described above with reference to FIG. 7. The graphical user interface examples 800, 802, 804 include graphical user interfaces displayed to a user to allow the user to interact with the image data collected by the sensors 110, 112 of the sensing component 104. Once the necessary image data has been selected, the scribe line offset (SLO) may be calculated.

FIG. 8A illustrates the first graphical user interface 800. In some examples, the first graphical user interface 800, which may be presented via the input/output device(s) 704 of a computing device, such as a display of computing device 108, may allow for selection of a primary image. The primary image may include image data collected by either, or both, of the sensors 110, 112, described above with reference to FIG. 1. The first graphical user interface 800 may include a browsing option that allows the user to browse from among all of the image data that has been collected from the sensors 110, 112.

FIG. 8B illustrates the second graphical user interface 802. The second graphical user interface 802, which may be presented via the input/output device(s) 704 of a computing device, such as the display computing device 108, may allow for selection of a secondary image. The secondary image may include image data collected by either, or both, of the sensors 110, 112. For example, if the user has selected image data collected by the first sensor 110 as the primary image, the user may select image data collected by the second sensor 112 as the secondary image. Including a primary image collected by the first sensor 110 and a secondary image collected by the second sensor 112 allows the computing device 108 to render a composite image. In some cases, the composite image can include a 360-degree view of the target component 106. In other examples, the user may choose from among various composite images previously rendered. The first graphical user interface 800 may include a browsing option that allows the user to browse from among the image data that has been collected from the sensors 110, 112. The primary image or the secondary image, or both, may include the image data showing the high-side marking of the directional tool 116.

FIG. 8C illustrates the third graphical user interface 804. The third graphical user interface 804, which may be presented via the input/output device(s) 704 of a computing device, such as the display of computing device 108, may allow for a user to position certain reference points to align the image with the interface overlay 806. In this example, the interface overlay 806 includes a horizontal line 808 and a perpendicular line 810 that intersect, along with a dashed circle 812. The interface overlay 806 may enable a user to align the interface overlay 806 with image data to determine a SLO. The interface overlay 806 may be configured according to the design of the sensing component 104 and the target component 106. For instance, the sensing component 104 and the target component 106 may be designed to place the downhole tool 116 and the directional tool 114 in the center of and parallel to the sensing component 104 and the center of and parallel to the target component 106, respectively. This design allows for alignment of the interface overlay 806 with the image data.

In some examples, the interface overlay 806 also includes two solid dots 814, 816 and one diamond marking 818 that help align the dashed circle 812 with the target component image 820, previously selected as the primary image in graphical user interface 800. In this example, the target component image 820 includes markings of the letters "A" through "H," with each letter representing a certain increment of the 360-degree circle.

The two solid dots 814, 816 may be placed adjacent to two outer diameter locations of the target component 106 shown in the target component image 820. The placement of the two solid dots 814, 816 helps align the dashed circle 812 of the interface overlay 806 with the target component 106 in the target component image 820. The alignment of the target component and the dashed circle helps set the bounds of the 360-degree circle of the target component and the dashed circle 812. The diamond marking 818 is aligned with a third boundary of the target component of the target component image 820 and helps further set the bounds of the 360-degree circle of the target component and the dashed circle 812.

In some examples, an open circle 824 is located at the intersection of the horizontal line 808 and a perpendicular line 810. This intersection is aligned with the center of the sensing component drilling tool, such as the downhole tool 116, which the sensing component 104 is attached to, which may further be aligned with the high-side marking. A horizontal axis reference point 822, represented by an open dashed circle, is also placed at the bounds of the dashed circle 812 along the horizontal axis. This horizontal axis reference point 822 is represented by a patterned circle and represents the location of the high-side marking of the sensing component drilling tool, such as the downhole tool 116, to which the sensing component is attached.

Next, in some examples, the user may then select a calculation point. The calculation point is identified on the graphical user interface 804 by the diamond marking 818. To determine the scribe line offset (SLO), the chosen calculation point, indicated by the diamond marking 818, is first identified. Next, the location of the target component drilling tool high-side marking, such as the directional tool 114, is determined with reference to the markings. While the location of the high-side marking may be known from the image data collected by the sensing component 104, the location of the target component drilling tool high-side marking with reference to the markings "A" through "H" may not be known or may not be visible in the chosen primary image.

In this illustration, the chosen calculation point is represented by the letter "G." The target component drilling tool high-side marking is known to be at a position located at position "A," however the label associated with the high-side marking may not be known. Since the unmarked location of the target component high-side marking is known, along with the increment or unit associated with each marking, the chosen calculation point "G" can be used to determine that the target component high-side marking is positioned at marking "A."

To determine that the target component high-side marking is located at marking "A," the angular offset between the chosen marking point "G" and the target component high-side marking point "A" 826 is determined. For example, if the target component high-side marking is known to be located 90 degrees clockwise from the marking "G," and each marking "A-H" is known to represent 45 degrees, the system can deduce that the target component marking is located two markings from "G" at marking "A." Once the target component high-side marking reference point "A" 826 is known, along with the horizontal access reference point 822, representing the location of high-side marking of the sensing component drilling tool, the SLO between the target component drilling tool high-side marking and the sensing component drilling tool high-side marking is determined.

Figure 9:
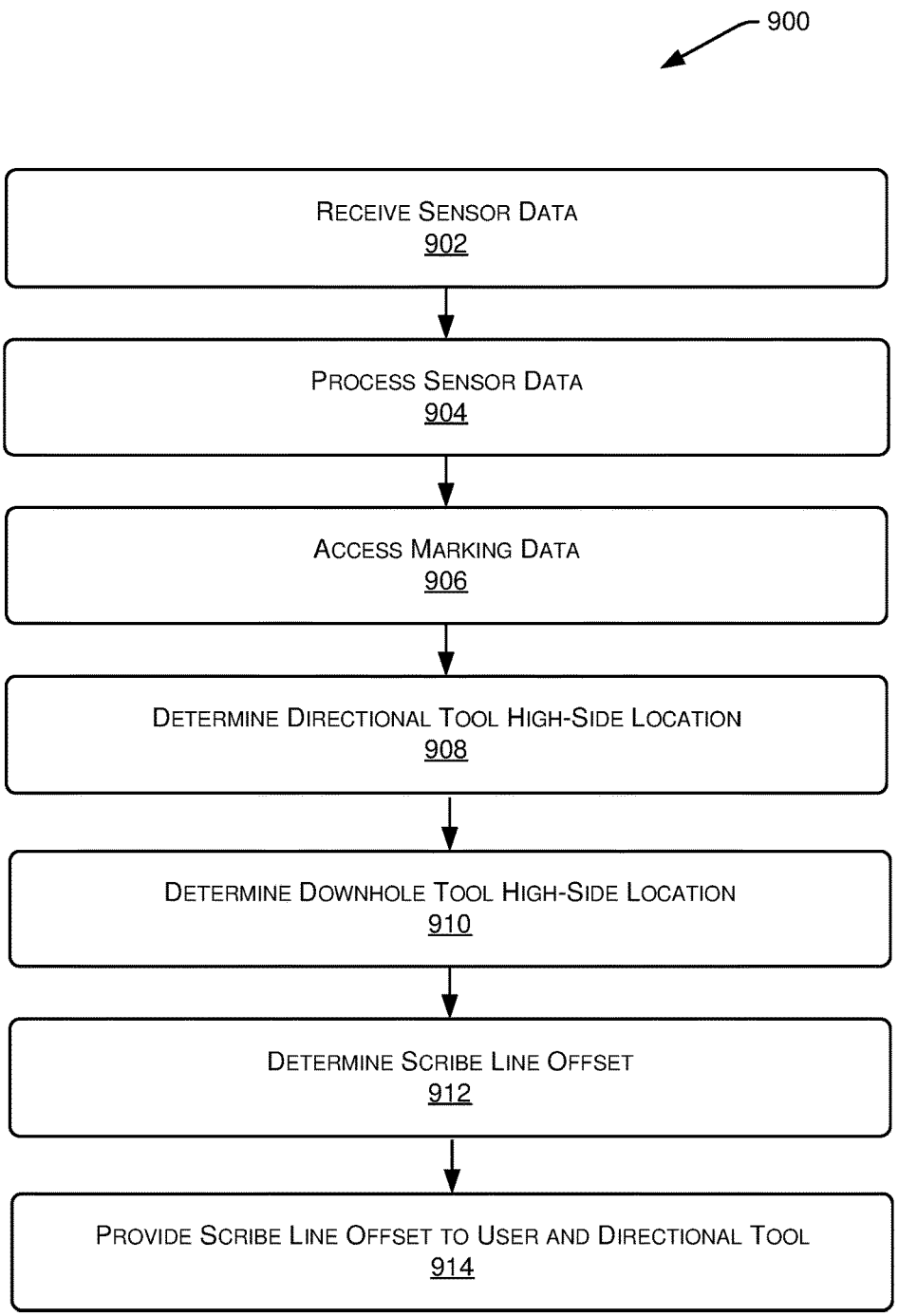
FIG. 9 illustrates an example flow diagram showing an illustrative process for determining a scribe line offset (SLO) using the angular offset apparatus of FIG. 1.

FIG. 9 illustrates an example flow diagram showing an illustrative process for determining a scribe line offset (SLO), or angular offset, using the angular offset apparatus 102 of FIG. 1 and the control system 700 of FIG. 7. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types. Also, a computing device is part of a system having multiple computing devices in communication with each other and/or one or more cloud services.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures, or environments.

As noted above, FIG. 9 illustrates an example flow diagram 900 illustrating example processes for determining a scribe line offset (SLO), or angular offset, using the angular offset apparatus 102 of FIG. 1. For example, as discussed above, a sensing component 104, a target component 106, and a computing device 108 may be used to determine the SLO of a rig environment. The computing device may implement a control system such as the control system 700 described above with respect to FIG. 7.

At operation 902, the sensor data is received. For example, the sensor data may be received by the control system 700 of the computing device 108. In this example, the sensor data receiving and processing module 710 of control system 700 may receive the sensor data for processing. In some instances, the sensor data is transmitted, either wirelessly or via a wired configuration, to the control system 700. For example, the one or more sensors of a sensing component may implement a wireless antenna, such as the wireless antenna described above with reference to FIG. 2, that is able to transmit the sensor data to the control system 700 of the computing device 108. In other examples, the one or more sensors may be hard-wired to an external device to transmit the sensing data to the computing device 108. In further examples, any long range or short range wireless communication methods may be used.

In some instances, the received sensor data is collected via one or more sensors, such as sensors 110, 112 of the sensing component 104 described above. For instance, the sensors 110, 112 may include imaging sensors configured to collect image data of the target component 106. In other instances, the sensor data may include sensor data related to local positioning, heat, light (e.g., including electromagnetic radiation of any frequency), etc. For example, the one or more sensors may be designed to detect light from the target component 106, such as from lasers that are included in an example target component. Additional and/or alternative examples include one or more sensors configured to detect indicator(s) produced via non-visible light.

At operation 904, the sensor data is processed. The sensor data is processed, for example, by the sensor data receiving and processing module 710. For instance, the sensor data receiving and processing module 710 may process the image data collected by sensors 110, 112 of the sensing component 104, and may produce a composite image for analysis by the other modules of the control system 700. As another example, the sensor data may be received from light detecting sensors such as the sensor(s) 610, described in FIG. 6, configured to detect from the light projecting component(s) 608, is processed.

At operation 906, the marking data is accessed. For instance, the target component marking data 720 may be accessed to retrieve previously stored data regarding the unit of measurement represented by each marking, the increment value of each marking, the marking labels, etc. In some examples, such as when implementing a local positioning system, the marking data may include the known location of the beacon or antenna. In still further examples, the marking data may include the known location that a sensor or marking/indicator component is placed at along the downhole tool or directional tool, such as a high-side marking location that has been stored in the control system 700.

At operation 908, the high-side location of the directional tool is determined. For example, the high-side location of the directional tool 114 is determined. For instance, the directional tool high-side determination module 712 may analyze the composite image to determine the location of the high-side marking of the directional tool 114 that the target component 106 is aligned with. As described above, the alignment of the target component 106 with the high-side marking of the directional tool 114 may be indicated in a number of ways, including a unique marking, an LED light, a laser beam, etc. that is shown in the composite image. Other methods for determining the location of the high-side marking of the directional tool 114 are also described above with respect to FIGS. 8A-C.

In other examples, the directional tool high-side determination module 712 may analyze local positioning data from one or more local positioning antennas or beacons. As described above, the location of the high-side marking of a directional tool may be determined by establishing a grid system (e.g., placing one or more local positioning components in an environment), placing an antenna or beacon at the directional tool, and measuring the time period needed for a ping from the antenna or beacon to travel to the local positioning component and the time period needed for the ping to travel back to the antenna or beacon. The directional tool high-side determination module 712 may then use the measured time periods, along with the known location/placement information of the antenna or beacon accessed at operation 910, to determine the location of the high-side of the directional tool. In still further examples, the location of the high-side of the directional tool may be known from the marking data that is accessed at operation 906.

At operation 910, the high-side location of the downhole tool is determined. For example, the downhole tool high-side determination module 714 may be used to determine the high-side location of the downhole tool. For instance, at least one sensor of the sensors 110, 112 of the sensing component 106 may be aligned with the high-side marking of the downhole tool 116 at a known location, serving as the origin location. The origin location data may be pre-programmed into the sensing component 106 and transmitted to the control system 700. In alternative examples, sensors may be located along the inner surface of the sensing component 106 that may be used to determine the location of the high-side marking of the downhole tool 116. In still further examples, markings along the sensing component 106 may help determine an offset between the high-side marking of the downhole tool 116 and the sensor. Other methods for determining the location of the high-side marking of the downhole tool 116 by utilizing input from a user via a graphical user interface are also described above with respect to FIGS. 8A-C.

In other examples, the downhole tool high-side determination module 714 may analyze local positioning data from one or more local positioning antennas or beacons. As described above, the location of the high-side marking of a downhole tool may be determined by establishing a grid system (e.g., placing one or more local positioning components in an environment), placing an antenna or beacon at the downhole tool, and measuring the time period needed for a ping from the antenna or beacon to travel to the local positioning component and the time period needed for the ping to travel back to the antenna or beacon. The downhole tool high-side determination module 714 may then use the measured time periods, along with the known location/placement information of the antenna or beacon, to determine the location of the high-side of the downhole tool.

At operation 912, the SLO is determined. The SLO is determined, for example, by the scribe line offset determination module 716. For instance, once the location of the high-sides of the directional tool and the downhole tool are known, as well as the target component marking data, the scribe line offset determination module 716 may determine the SLO, or angular offset, between the high-side of the directional tool and the high-side of the downhole tool. In some examples, a user may utilize the marking data to help determine the SLO. For example, the user may pick reference points, or markings, to be used to calculate the SLO as described above with respect to FIGS. 8A-H. At operation 914, the SLO may be provided to the user and the directional tool via the communication interface(s) 704 for use in directional drilling operations.

Figure 10:
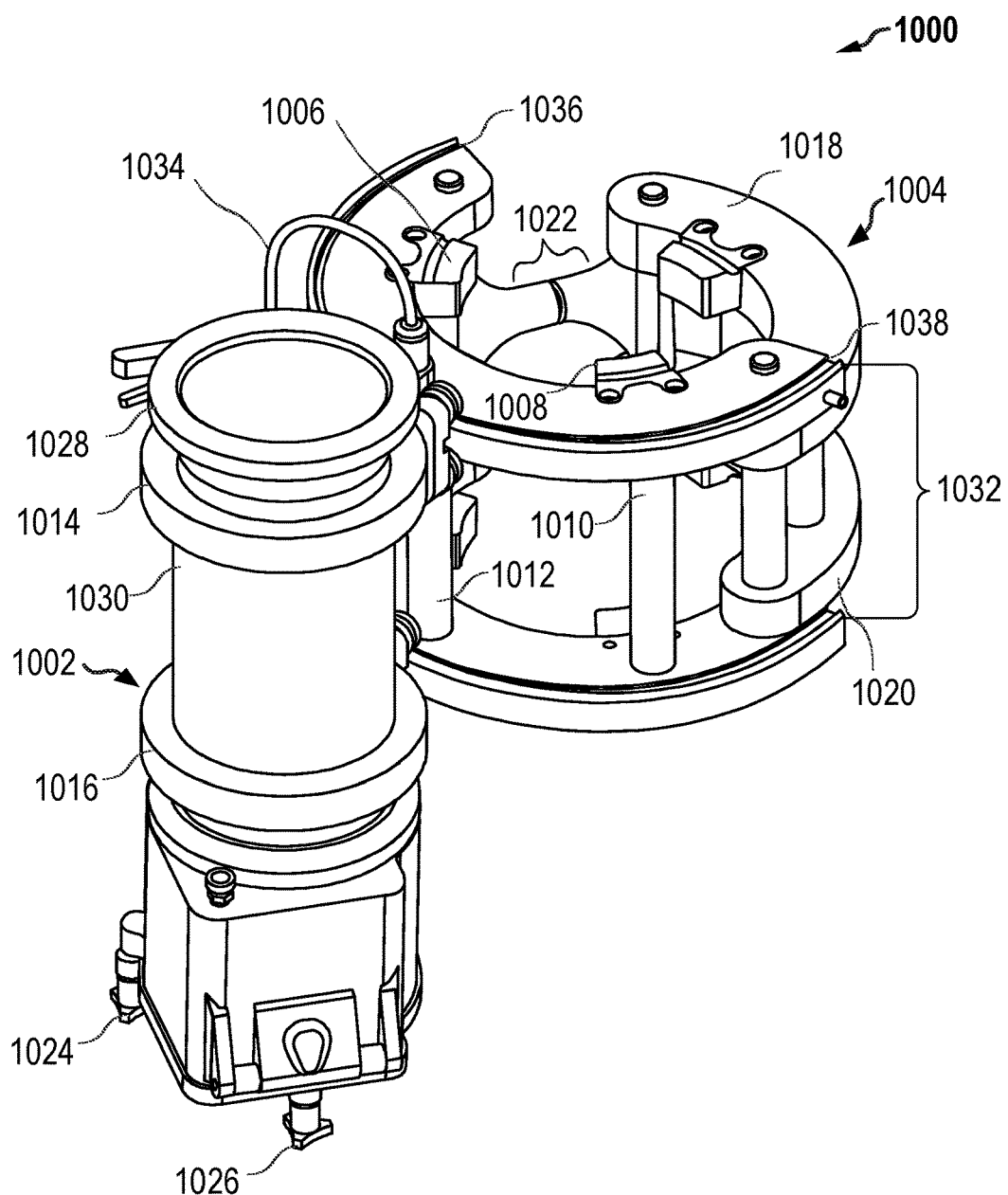
FIG. 10 illustrates a side view of another embodiment of a sensing component of an angular offset apparatus according to some examples.

FIG. 10 illustrates a perspective view of another example sensing component 1000 of the angular offset apparatus described herein. In this example, the sensing component 1000 implements one imaging sensor 1002 placed at a downhole tool or drilling tool and configured to capture image content. For example, the sensing component 1000 may be placed at an external high-side marking of a downhole tool or drilling tool of a drilling environment. The sensing component 1000 may rotate about the downhole tool or drilling tool to capture sensor data associated with the drilling environment.

In this example, the imaging sensor 1002 may be placed adjacent to an external high-side marking (not shown) of a downhole tool (not shown) at the start of a rotation to help determine an approximate origin location of the imaging sensor 1002. Knowing the origin location of the imaging sensor 1002 may help determine the scribe line offset (SLO) by providing information such as the location of the high-side marking of the downhole tool (e.g., the origin of the offset of the rig) as well as helping to set the aspect ratio of the image content or helping to determine other significant values needed for the SLO calculation. In other embodiments, the imaging sensor 1002 may be placed away from the high-side marking of the downhole tool. In some embodiments, the sensing component 1000 itself may include a marking or indicator that may be aligned with an external high-side marking of a tool that may help align the imaging sensor 1002 with the external high-side marking at the start of the rotation.

In some examples, the image content may include image data, captured by the imaging sensor 1002 during a rotation about the tool. For example, if the sensing component 1000 is placed adjacent to an external high-side marking of a downhole tool (not shown), the image content may include image data showing a marker or indication of the location of a second high-side marking of another drilling tool, such as a directional tool, of a bottom hole assembly (BHA). The location of the drilling tool high-side marking, along with the location of the downhole tool high-side marking, may be used to determine the SLO, sometimes referred to as the angular offset, of the two high-side markings with increased precision and accuracy.

In the illustrated example, the sensing component 1000 implements a mounting mechanism 1004 that can be latched and unlatched for attachment and removal, respectfully, of the sensing component 1000. The mounting mechanism may be similar in design to the mounting mechanism describe above with respect to FIG. 2. For example, the mounting mechanism 1004 may implement various components such as one or more attachment fasteners 1006, 1008, one or more transport mechanisms 1010, 1012, one or more mounting brackets 1014, 1016, and one or more connecting brackets 1018, 1020, similar in design and function to those described above with respect to FIG. 2. The mounting mechanism 1004 may help ensure that that sensing component 1000, or a marking or indicator of the sensing component 1000, is aligned with the center line of the downhole drilling tool, or other tool, when mounted.

The mounting mechanism may further implement a sensing component latching mechanism 1022. The latching mechanism 1022 may be located adjacent to a rotatable handle (not shown) and operable by way of the rotatable handle. For example, the latching mechanism may include a threaded bolting system that is loosened or tightened, or opened or closed, by way of the rotatable handle. In other examples, other latching mechanisms may be used such as magnets, brackets, straps, etc. The latching mechanism 1022 and rotatable handle may be similar in design and function to those described above with respect to FIG. 2.

In some examples, the sensing component 1000 may further implement one or more imaging sensor backplates (not shown), one or more backplate fasteners 1024, 1026, one or more protective lenses 1028, one or more exterior housings 1030, and a wireless antenna (not shown) similar in design and function to those described above with respect to FIG. 2. The wireless antenna may be placed adjacent to any location on the sensing component 1000 where the wireless antenna is able to transmit wireless signal data. In some examples, the sensing component 1000 may not implement a wireless antenna at all, but instead may implement other wireless technology, such as short range or long range wireless communication.

In this example, the sensing component 1000 also implements a rotation assembly about which the imaging sensor 1002 rotates. For instance, in the illustrated example, the sensing component 1000 implements a roller bearing assembly 1032 allowing for the imaging sensor 1002 to rotate 180 degrees about a tool. In other examples, other rotation assemblies may be implemented, such as a magnetic rotation assembly, and the rotation assembly may be manually or automatically controlled, via other mechanical means.

For example, in FIG. 10, the embodiment shown is manually controlled and the sensing component 1000 implements a release mechanism 1034. The release mechanism 1034 may include a handle. In some instances, when the release mechanism 1034 is lifted the imaging sensor 1002 becomes mobile and may be manually rotated along the roller bearing assembly 1032. In other instances, when the handle is lowered, or released from the lifted position (as shown in FIG. 10), the imaging sensor 1002 becomes stationary and is not able to be rotated about the roller bearing assembly 1032. The release mechanism 1034 allows the imaging sensor 1002 to be stationary in a desired position to capture image data. In other examples, the sensing component 1000 may be automatically controlled via mechanical means and may be controlled either locally or externally to the sensing component 1000.

In some examples, the imaging sensor 1002 rotates about the roller bearing assembly 1032 to capture image data of the drilling environment. The imaging sensor 1002 may capture image data in a continuous or non-continuous manner while in rotation. For example, the imaging sensor 1002 may capture image data continuously throughout the rotation about the roller bearing assembly 1032. In other examples, the imaging sensor 1002 may capture image data only at the beginning and end of the rotation. For instance, the imaging sensor 1002 may capture image data while at a first end 1036 of the roller bearing assembly 1032 and while at a second end 1038 of the roller bearing assembly 1032, resulting in image data spaced 180 degrees apart. The first end 1036 of the roller bearing assembly 1032 may include a marker or indicator that aligns with an external high-side marking of tool, such as a downhole tool or drilling tool, to which the sensing component 1000 is attached.

The non-continuous image data may be processed and utilized for calculating the SLO. During processing, image rendering may be performed, an aspect ratio may be set, combined images may be generated, image recognition techniques may be applied, etc. For instance, the image data captured at the beginning and end of the rotation, such as at first end 1036 of the roller bearing assembly 1032 and at the second end 1038 of the roller bearing assembly 1032, may be combined to render a 360 degree image of the drilling environment.

In addition, while the sensing component 1000 illustrated in FIG. 10 is removable, alternative examples may include a sensing component 1000 that is permanently attached to a drilling tool. Also, the sensing component 1000 may not implement a mounting mechanism 1004 and may be attached to a tool via alternative attachment means. For example, other mounting mechanisms may be separate components, independent of the sensing component 1000, that may be attached to the desired tool or may be manufactured as a part of the tool. The sensing component 1000 may also be modular in nature, and may be attached to an independent mounting mechanism at a later time.

Still further, the sensing component 1000 may be attached to a tool, such as a downhole tool, by other attachment or mounting means. For example, the sensing component 1000 could be attached to the downhole tool by a spring-loading mounting mechanism. The spring-loading mounting mechanism may implement a collar with one or more springs that allows the sensing component 1000 to be attached to downhole tools varying in diameter. In addition, the sensing component 1000 may be attached to downhole tools with straps or magnetic components that can be placed around the exterior of the downhole tool.

The exact number and arrangement of the sensing component 1000 components described above may vary according to the specific angular offset apparatus, drilling rig configuration, and other considerations. For example, in the illustrated example, the sensing component 1000 implements one imaging sensor 1002 and thus implements two mounting brackets 1014, 1016, located at opposite ends of the imaging sensor 1002. In other examples, the sensing component may implement two imaging sensors, rotatable around the exterior of a tool, and may implement four mounting brackets, as described above with respect to the embodiment of FIG. 2. Or, the sensing component may implement some other plurality (e.g., six, ten, twenty, etc.) of imaging sensors, which can be stationary or rotatable, which may result in a different configuration of mounting bracket(s). Thus, since other sensing component 1000 configurations may implement a different number of sensors, or the sensors may have a different arrangement, varied components may be implemented.

Note that the design and implementation of the angular offset apparatus shown in FIG. 10 is not a limiting embodiment. Other designs may be considered and implemented according to the environment, requirement, and design considerations described herein.

FIG. 11 illustrates a perspective view of an example drilling assembly 1100 implementing another embodiment of an angular offset apparatus (e.g., angular offset apparatus 102) according to some examples. In the illustrated example, an angular offset apparatus 1100 includes a sensing component 1102, target component 1104, and a computing device 1106. The sensing component 1102 may include a sensing mount 1108 and an imaging device 1110. The target component 1104 may include a target mount 1112 and marking component 1114, such as LED component 1124. In some embodiments, the sensing component 1102 is configured to collect data related to the target component 1104 to determine an offset, such as the angular offset and scribe line offset (SLO) described herein. The computing device 1106 may be similar in function to computing device 108 and may implement a control system such as the control system 700 described above with respect to FIG. 7. In some examples, the computing device 1106 may also be implemented within the sensing component 1102.

In some examples, the sensing component 1102 is placed, or mounted, adjacent to a high-side marking of a drilling tool in a drilling environment. For example, in the illustrated example of FIG. 11, the sensing component 1102 is mounted adjacent to a downhole tool high-side marking 1116 of a downhole tool 1118. In some embodiments, the sensing mount 1108 is configured to mount, or secure, the sensing component 1102 to the downhole tool 1118 and align the sensing component 1102 with the downhole tool high-side marking 1116. In some embodiments, the sensing mount 1108 may include an angular mounting component, such as a v-bar, and/or one or more magnets, straps, clamps, cables, etc. In some embodiments, the sensing component 1102 may be placed adjacent to other locations within a rig environment or along a drilling tool.

In some embodiments, the sensing component 1102 may implement one or more devices configured to collect data related to imaging, local positioning, heat, light, etc. For example, in the illustrated example of FIG. 11, the sensing component 1102 includes an imaging device 1110 implementing one or more imaging sensors configured to collect image data associated with the target component 1104. In particular, the image data may include image data of a location of the target component 1104 relative to the high-side marking of one or more drilling tools. In some examples, the imaging device 1110 may include a camera, smart phone, tablet, or other device capable of collecting imaging data. The captured/collected image data may be transmitted, either wired or wirelessly, to a cloud-based system where the image data can be stored and/or processed. During processing, image rendering may be performed, an aspect ratio may be set, combined images may be generated, image recognition techniques may be applied, etc.

In some examples, the target component 1104 may be placed adjacent a directional tool high-side marking 1120 of a directional tool 1122, or elsewhere throughout the drilling environment. In some embodiments, the target component 1104 includes a target mount 1112 to secure, or mount, the target component 1104 to the directional tool 1122 and align the target component 1104 with the directional tool high-side marking 1120. In some embodiments, the target mount 1112 may include an angular mounting component, similar to the v-bar of the sensing mount 1108, and/or one or more magnets, straps, clamps, cables, etc., which will be described herein. In other examples, the target component 1104 may be placed adjacent to other locations within a rig environment or along a drilling tool.

In some embodiments, the target component 1104 may include one or more indicators placed adjacent the directional tool high-side marking 1120 of the directional tool 1122 that are able to be detected by the imaging device 1110. For example, the target component 1104 may include the marking component 1114, including LED component 1124, aligned with the directional tool high-side marking 1120 and configured to emit light for detection by the sensing component 1102. The LED component 1124 may include one or more LED lights that function as part of an illumination system.

In various embodiments, the data captured by the imaging device 1110 may include image data depicting the LED component 1124 of the target component 1104 within the drilling environment, such as aligned with the directional tool high-side marking 1120. The image data may be transmitted, either wired or wirelessly, to a cloud-based system where the image data can be stored and/or computations performed, as described herein. For example, the image data may be transmitted to the sensor data receiving and processing module 710 of the control system 700, described in FIG. 7.

In addition, the image data may depict at least a portion of the measuring instrument 1204, the downhole tool high-side marking 1116, and/or other image data of the drilling environment. For example, the image data may depict the markings of the measuring instrument 1204, such as the marking indicating the fixed location of the imaging device 1102 relative to the downhole tool high-side marking 1116 of the downhole tool 1118. By utilizing the image data of the target component 1104, along with the image data indicating a location of the imaging device 1102 (e.g., a known location as indicated by the image data, such as image data indicating the marking of the measuring instrument 1204 the imaging device 1102 is fixed at), the SLO between the downhole tool high-side marking 1116 of the downhole tool 1118 and the directional tool high-side marking 1120 of the directional tool 1122 may be determined.

In some embodiments, once the angular offset between the sensing component 1102 and the target component 1104 is known, the sensing component 1102 may be transferred to another location within the drilling environment according to the angular offset. For example, once the angular offset value reflecting the offset between the sensing component 1102 and the target component 1106 is known, the sensing component 1102 may be transferred to another location laterally along the drilling assembly 1100. In some examples, at the new location, the sensing component 1102 may be aligned relative to the target component 1104 according to the angular offset value. For example, if the angular offset value is found to be ten degrees in a certain direction, the sensing component 1102 may be aligned ten degrees, in the determined direction, from the target component 1104 at the new location within the drilling environment 1100, such as at the directional tool 1122. As such, the angular offset between the sensing component 1102 and the target component 1104 may be reflected at any placement along the drilling assembly 1100.

FIG. 12 illustrates a side view of the sensing component 1102 of the angular offset apparatus 1100 of FIG. 11. In the illustrated example of FIG. 12, the sensing component 1102 includes a sensing mount 1108 and an imaging device 1110 including one or more detachable imaging sensors. In some embodiments, the sensing component 1102 is configured to collect data related to the target component 1104 to determine an angular offset value, such as a scribe line offset (SLO).

In some embodiments, the sensing component 1102 is mounted adjacent to the downhole tool high-side marking 1116 of a downhole tool 1118 via the sensing mount 1108. However, the sensing component 1102 may be mounted at other locations within the rig environment, such as adjacent the directional tool 1122 shown in FIG. 11. In some examples, the sensing mount 1108 is configured to secure, or mount, the sensing component 1102 to the downhole tool 1118 and align the sensing component 1102 with the downhole tool high-side marking 1116. In some embodiments, the sensing mount 1108 may include an angular mounting component, such as a v-bar, and/or one or more magnets, straps, clamps, cables, etc.

In further examples, the sensing mount 1108 may include a sensing mount indicator 1202, such as a metal pin, that extends through the sensing mount 1108 and helps achieve alignment with the downhole tool high-side marking 1116 of the downhole tool 1118. For example, the downhole tool high-side marking 1116 may include an external indention (or other physical marker) and the sensing mount indicator 1202 may be configured to be inserted within the indention and serve as an additional mechanism to ensure alignment of the sensing component 1102 with the downhole tool high-side marking 1116.

In some embodiments, the sensing component 1102 may implement one or more devices configured to collect data related to imaging, local positioning, heat, light, etc. For example, in the illustrated example, the sensing component 1102 implements an imaging device 1110 along a measuring instrument 1204. In other examples, the sensing component 1102 may implement more than one imaging device(s) 1110 to accommodate a drilling assembly configuration. In some examples, the imaging device 1110 may include a camera, smart phone, tablet, or other device capable of collecting imaging data related to indicators implemented via the target component 1104 (e.g., LED indicators or other illumination elements of the target component being aligned with the directional tool high-side marking 1120 of the directional tool 1122).

In further embodiments, the imaging device 1110 may include one or more imaging sensors configured to collect image data from a variety of perspectives. For example, the imaging device 1110 may include an imaging sensor on a front surface and an additional imaging sensor on a back surface. For instance, the imaging sensor may be included in a smart phone and may have a front-facing camera and a back-facing camera. In this example, the imaging device 1110 may collect image data of the target component 1104, as well as the sensing mount 1108, the sensing mount indicator 1202, etc. In this way, the additional image data can be utilized to help determine an origin point of the imaging device 1110 and provide image data for calculating the angular offset, calculating the SLO, setting aspect ratios, and performing other image analysis and calculations.

For example, in some embodiments, the imaging device 1110 may be mounted along the measuring instrument 1204 via an imaging device mount 1206. In some examples, the measuring instrument 1204 may include a semi-circle including one or more markings indicating a unit of measurement (e.g., a protractor) and one or more indicators configured to visually indicate a division of the measuring instrument 1204 into one or more portions. To illustrate, the measuring instrument 1204 may include one or more color coded portions configured to indicate the portion of the measuring instrument 1204 that is included in the image data collected by the imaging sensor 1110.

In some examples, the imaging device 1110 may be positioned at a fixed angle (e.g., a 90-degree angle) relative to the downhole tool high-side marking 1116 and may serve as an origin point for determining the angular offset and/or SLO. In other examples, the imaging device mount 1206 may include one or more dowels configured to allow for extension/contraction of the imaging device 1110 from/to the measuring instrument 1204, as well as 360-degree rotation. For example, the one or more dowels may allow the imaging device 1110 to move in a vertical and/or horizontal direction to/from the measuring instrument 1204 and relative to the downhole tool 1118. In this way, the imaging device mount 1206 may allow the imaging device 1110 to collect image data from a variety of angles within the drilling environment. In addition, the imaging device mount 1206 may allow the imaging device 1110 to collect data indicating the downhole tool high-side marking 1116, the sensing mount indicator 1120, and/or the one or more markings of the measuring instrument 1204 indicating the unit of measurement associated with the placement of the imaging device 1110 relative the downhole tool high-side marking 1116.

In some embodiments, the imaging device 1110 may be positioned at a first endpoint 1208 or second endpoint 1210 of the measuring instrument 1204, both of which can be at a fixed angle (e.g., 90-degrees) from the downhole tool high-side marking 1116 of a downhole tool 1118. The placement of the imaging sensor 1110 along the measuring instrument 1204 may be dependent on the positioning of the target component 1104 and may vary based on the drilling assembling configuration. For example, in some examples, the imaging sensor 1110 may be placed on the directional tool 1122. In other examples, one or more imaging sensors 1110 maybe placed throughout the drilling environment. In further examples, the imaging device 1110 may be positioned at another point along the measuring instrument 1204 or may be located elsewhere in the drilling environment, with the unit of measurements shown on the measuring instrument 1204 configured to indicate the placement of the imaging device 1110 relative to the downhole tool high-side marking 1116.

By utilizing the image data of the target component 1104, along with the known location of the imaging device 1110, and/or the image data indicating a location of the imaging device 1110 (e.g., the image data indicating the downhole tool high-side marking 1116, the sensing mount indicator 1120, and/or the one or more markings of the measuring instrument 1204), the angular offset between the downhole tool high-side marking 1116 of the downhole tool 1118 and the directional tool high-side marking 1120 of the directional tool 1122 may be determined utilizing the techniques and methods as described herein and with respect to at least FIGS. 7-9.

Figure 13:
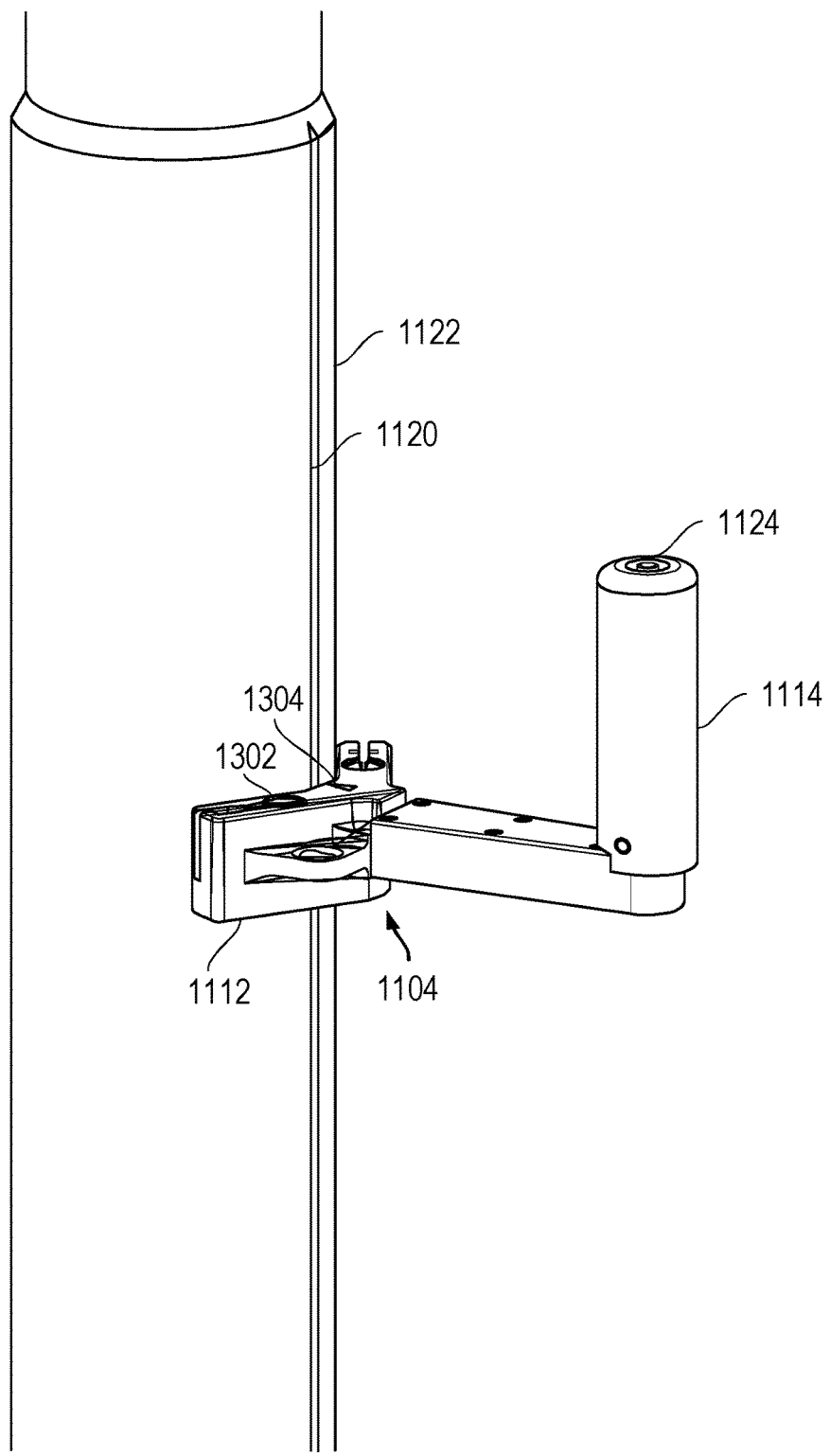
FIG. 13 illustrates a side view of the target component of the angular offset apparatus of FIG. 11.

FIG. 13 illustrates a side view of the target component 1104 of the angular offset apparatus 1100 of FIG. 11. In the depicted example, the target component 1104 includes the target mount 1112 and the marking component 1114. In some examples, the target component 1104 may be placed adjacent a directional tool high-side marking 1120 of a directional tool 1122. However, the target component 1104 may be placed elsewhere along the directional tool 1122 or within the drilling environment dependent on the rig environment and drilling configuration.

In some embodiments, the target component 1104 includes a target mount 1112 to secure, or mount, the target component 1104 to the directional tool 1122 and align the target component 1104 with the directional tool high-side marking 1120. In some examples, the target mount 1112 may include an angular mounting component 1302, similar to the v-bar of the sensing mount 1108, along with a wrap support (not shown). In some examples, the angular mounting component 1302 may include one or more mounting mechanisms, such as magnets, to affix the angular mounting component 1302 to the directional tool 1122. In some examples, the wrap support is affixed to an outside surface of the angular mounting component 1302 and may be configured to affix the target component 1104 to the directional tool 1122. The wrap support may be comprised of a variety of materials able to support the weight load of the target component 1104 (e.g., a tension strap) including, but not limited to, plastic, aluminum, steel, carbon fiber, etc.

In further examples, the target mount 1112 may include a secondary fall restraint (not shown). The secondary fall restraint may include one or more carabiners and one or more cables capable of supporting the weight load of the target component 1104. In some examples, the secondary fall restraint may be attached directly to the directional tool 1122. Alternatively, or in addition to, the secondary fall restraint may be attached any drilling tool in the drilling environment. In some embodiments, the cable(s) may be comprised of material that has satisfied a load test associated with the target mount 1112. The secondary fall restraint may be configured to secure the target component 1104 should the angular mounting component 1302 and/or wrap support fail and the target mount 1112 of the target component 1104 become destabilized.

In still further examples, the target mount 1112 may include a target mount indicator 1304, such as a metal pin, that extends through the target mount 1112 and aids the alignment with the directional tool high-side marking 1120 of the directional tool 1122. For example, the directional tool high-side marking 1120 may include an indention (or other physical marker) and the target mount indicator 1304 may be configured to insert within the indention and serve as an additional mechanism to ensure alignment of the target component 1104 with the directional tool high-side marking 1120. In some examples, the target mount 1112 may also include one or more dowels configured to allow for extension/contraction of the LED component 1124 from/to the target mount 1112, as well as 360-degree rotation. For example, the one or more dowels may allow the target mount 1112 to extend/contract horizontally and/or vertically from the target mount 1112 and relative to the directional tool 1122.

In some embodiments, the target component 1104 may include one or more indicators placed adjacent the directional tool high-side marking 1120 of the directional tool 1122 able to be detected by the imaging device 1110. For example, the target component 1104 may include an LED component 1124 aligned with the directional tool high-side marking 1120 that is configured to emit light for detection by the sensing component 1102. The LED component 1124 may be linear in design, such as a bar configuration, and may include one or more LED lights extending along the LED component in a linear fashion and functioning as part of an illumination system. In some examples, the one or more LED lights may vary in color.

In various embodiments, during image analysis by the sensor data receiving and processing module 710 of the control system 700, a mathematical formula or other function may be applied to the image data depicting the one or more LED lights to create a linear relationship between the one or more LED lights. This linear relationship, may be utilized by the directional tool high-side determination module 712 to determine the angular offset and/or SLO.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An angular offset tool comprising:
   a marking component configured for disposal adjacent to a first indicator on a first tool at a first position along a drilling assembly configured for disposal subsurface;
   a sensing component configured for disposal adjacent to a second indicator on a second tool at a second position along the drilling assembly;
   the sensing component including a sensor configured to capture data associated with the marking component;
   wherein the marking component and the sensing component are configured for respective detachment from the first tool and the second tool prior to subsurface disposal of the tools on the drilling assembly; and
   a computing system configured to analyze the data captured by the sensor to determine an angular offset between the first tool and the second tool.

2. The angular offset tool of claim 1, wherein the marking component includes one or more light emitting elements.

3. The angular offset tool of claim 1, wherein the sensing component includes a measuring instrument and the sensor is configured for disposal at different positions on the measuring instrument.

4. The angular offset tool of claim 3, wherein the measuring instrument includes one or more color coded portions.

5. The angular offset tool of claim 1, wherein the sensor is disposed on a smart device.

6. The angular offset tool of claim 3, wherein the sensing component includes multiple sensors disposed thereon.

7. The angular offset tool of claim 6, wherein at least one of the multiple sensors is configured to capture data associated with at least one of the measuring instrument or the second indicator of the second tool.

8. The angular offset tool of claim 1, wherein determining the angular offset between the first tool and the second tool comprises:
   determining a location of the first indicator of the first tool based at least in part on the captured sensor data;
   determining a location of the second indicator of the second tool based at least in part on the captured sensor data; and
   determining the angular offset between the location of the first indicator of the first tool and the location of the second indicator of the second tool.

9. The angular offset tool of claim 1, wherein the sensing component is configured to extend from the second tool, contract to the second tool, or rotate about the second tool.

10. A system comprising:
    one or more indicators, the one or more indicators located on a first tool of a drilling assembly configured for disposal subsurface;
    a sensing component located on a second tool of the drilling assembly, the sensing component including one or more sensors disposed thereon to capture data associated with the one or more indicators;
    wherein the first tool is disposed at a first position along the drilling assembly and the second tool is disposed at a second position along the drilling assembly;
    wherein the one or more indicators and the sensing component are configured for respective detachment from the first tool and the second tool prior to subsurface disposal of the tools on the drilling assembly; and
    a computing system configured to determine a relationship between the first tool and the second tool, wherein determining the relationship includes analyzing the data captured by the one or more sensors to determine an angular offset between the first tool and the second tool.

11. The system of claim 10, wherein the one or more indicators include at least one of a light-emitting indicator, a heat-emitting indicator, a unique physical marking, or a local positioning antenna.

12. The system of claim 10, wherein the one or more indicators are aligned with at least one of a first directional marking of the first tool or a second directional marking of the second tool.

13. The system of claim 12, wherein determining the angular offset between the first tool and the second tool includes determining the angular offset between the first directional marking of the first tool and the second directional marking of the second tool.

14. A method comprising:
- mounting a marking component adjacent to a first indicator on a first tool disposed at a first position along a drilling assembly configured for disposal subsurface;
- mounting a sensing component adjacent to a second indicator on a second tool disposed at a second position along the drilling assembly, wherein the sensing component includes a sensor disposed thereon;
- capturing data with the sensor, the data including data associated with the marking component;
- respectively detaching the marking component and the sensing component from the first tool and the second tool prior to subsurface disposal of the tools on the drilling assembly; and
- determining an angular offset between the first tool and the second tool using data captured by the sensor.

15. The method of claim 14, wherein the marking component includes one or more light emitting elements.

16. The method of claim 14, wherein the sensing component includes multiple sensors disposed thereon.

17. The method of claim 14, further comprising capturing data associated with at least one of a measuring instrument disposed on the sensing component or the second indicator of the second tool.

18. The method of claim 17, further comprising capturing data representing color coded portions of the measuring instrument.

19. The method of claim 14, wherein determining the angular offset between the first tool and the second tool includes transmitting data captured by the sensor to a computing system.

20. The method of claim 14, wherein the sensor is disposed on a smart device.

* * * * *